(12) United States Patent
Koori

(10) Patent No.: US 7,702,632 B2
(45) Date of Patent: Apr. 20, 2010

(54) INFORMATION PROCESSING APPARATUS, INFORMATION PROCESSING METHOD, AND COMPUTER PROGRAM

(75) Inventor: Takayuki Koori, Kanagawa (JP)

(73) Assignee: Sony Corporation, Tokyo (JP)

( * ) Notice: Subject to any disclaimer, the term of this patent is extended or adjusted under 35 U.S.C. 154(b) by 591 days.

(21) Appl. No.: 10/544,619

(22) PCT Filed: Nov. 12, 2004

(86) PCT No.: PCT/JP2004/016867

§ 371 (c)(1),
(2), (4) Date: Aug. 5, 2005

(87) PCT Pub. No.: WO2005/059775

PCT Pub. Date: Jun. 30, 2005

(65) Prior Publication Data
US 2006/0184573 A1   Aug. 17, 2006

(30) Foreign Application Priority Data
Dec. 15, 2003   (JP)   ............... 2003-416626

(51) Int. Cl.
*G06F 7/00*   (2006.01)
*G06F 17/00*   (2006.01)
(52) U.S. Cl. .................... 707/7; 707/102; 707/104.1
(58) Field of Classification Search .............. 707/1, 707/7, 102, 104.1; 386/95, 96
See application file for complete search history.

(56) References Cited

U.S. PATENT DOCUMENTS 5,123,088 A * 6/1992 Kasahara et al. ............ 715/854
7,143,114 B2 * 11/2006 Cazier ......................... 707/200

(Continued)

FOREIGN PATENT DOCUMENTS

JP        4-276857        10/1992

(Continued)

OTHER PUBLICATIONS

Noriyuki Hiki, "Senren Sareta Interface no MP3 Sakusei/ Saisei Soft iTunes2", Mac Power, vol. 13, No. 2, pp. 108 to 111, Feb. 1, 2002.

(Continued)

*Primary Examiner*—Vincent Boccio
(74) *Attorney, Agent, or Firm*—Oblon, Spivak, McClelland, Maier & Neustadt, L.L.P.

(57) ABSTRACT

An apparatus and a method for information processing that enable effective content management and retrieval are provided. Content attribute information is obtained via a recording medium such as a CD or the like, a network, or as user input data, an artist name is extracted from the obtained content attribute information, initial letter information is determined on a basis of the artist name, and the initial letter information is stored and registered as content management information in a data storage unit. Also, editing of the registered information is made possible. This constitution enables a data search process using the initial letter information as a search key and a sort process. Further, the artist name is automatically determined and registered regardless of a kind of the artist name such as the alphabet, kana, or katakana. Therefore a process is made possible which generates and registers the management data efficiently and quickly and hence reduces a burden on the user.

18 Claims, 15 Drawing Sheets

| ID | MUSICAL PIECE NAME/ ALBUM NAME | ARTIST NAME | ARTIST INITIAL LETTER | GENRE | MUSICAL PIECE FILE NAME |
|----|-------------------------------|-------------|----------------------|-------|------------------------|
| 1  | Album A | Jamiroquai | J | Funk | |
| 2  | Song-A  | Jamiroquai | J | Funk | C:¥Root¥Song-A¥track.omg |
| 3  | Song-B  | Jamiroqual | J | Funk | C:¥Root¥Song-B¥track.omg |
| 4  | Album B | The Beatles | B | Rock | |
| 5  | Song-C  | The Beatles | B | Rock | C:¥Root¥Song-C¥track.omg |
| 6  | Album C | Miles Davis | M | Jazz | |
| 7  | Song-D  | Miles Davic | M | Jazz | C:¥Root¥Song-D¥track.wav |
| :  | :       | :          | : | :    | : |

U.S. PATENT DOCUMENTS

2003/0086699 A1 * 5/2003 Benyamin et al. ............. 386/96

FOREIGN PATENT DOCUMENTS

| | | |
|---|---|---|
| JP | 10-308810 | 11/1998 |
| JP | 2000-270079 | 9/2000 |
| JP | 2003-323181 | 11/2003 |

OTHER PUBLICATIONS

Tamao Nishibayashi, "Jun Kokusan RDBMS HiBase no Subete (2)", Macintosh Developer's Journal, No. 29, pp. 68 to 73, Feb. 15, 1998.

"Onshitsu ni Kodawatte Ongaku CD no Ripping ya Kakikomi o Okonau", PC Japan, vol. 7, No. 7, pp. 80 to 85, Jul. 1, 2002.

Noburu Matsuoka et al., "Tairyo no Gazo ya Ongaku File o Ichimai no Media e Hozon", PC Japan, vol. 8, No. 3, pp. 70 to 79, Mar. 1, 2003.

* cited by examiner

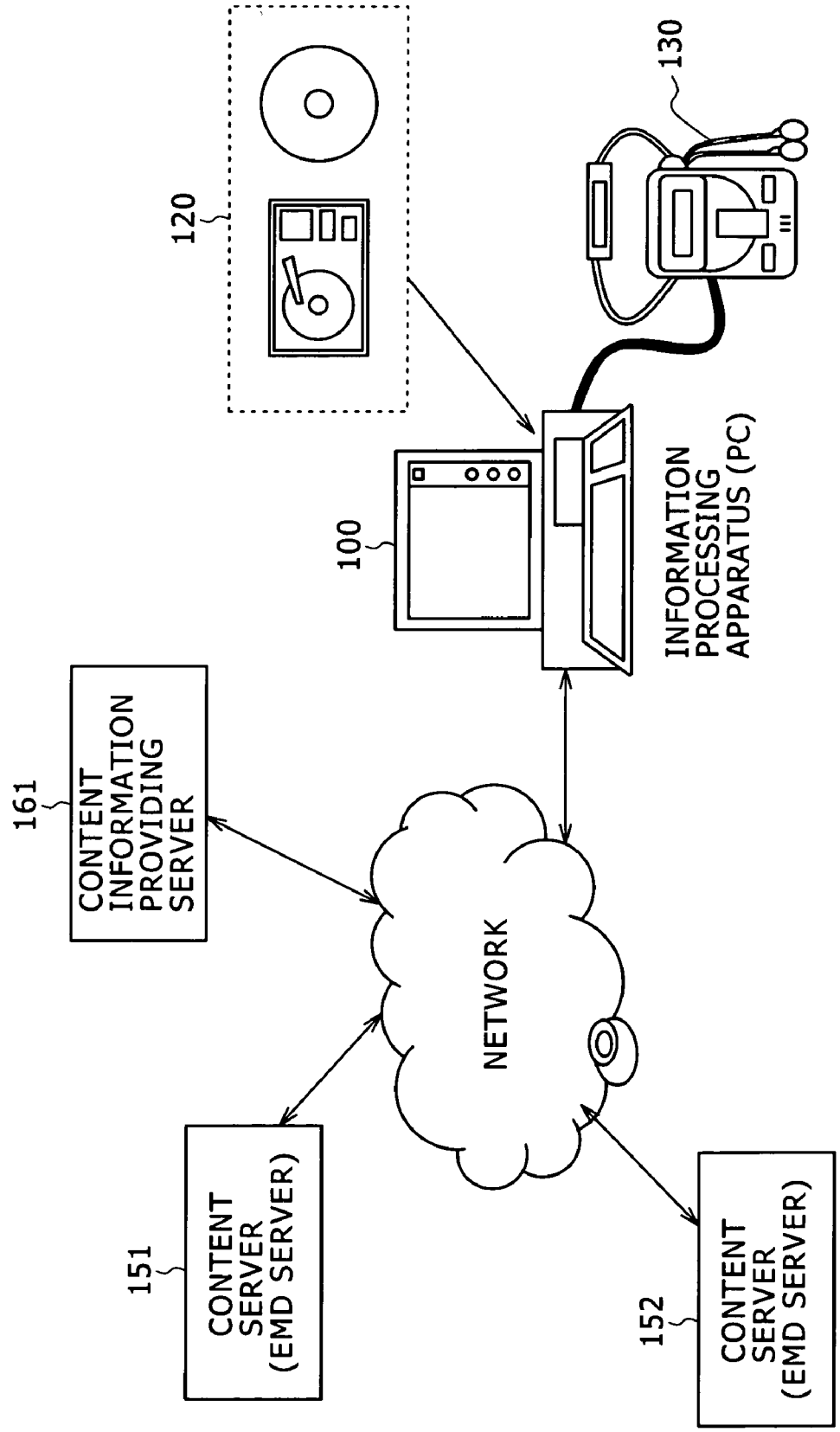

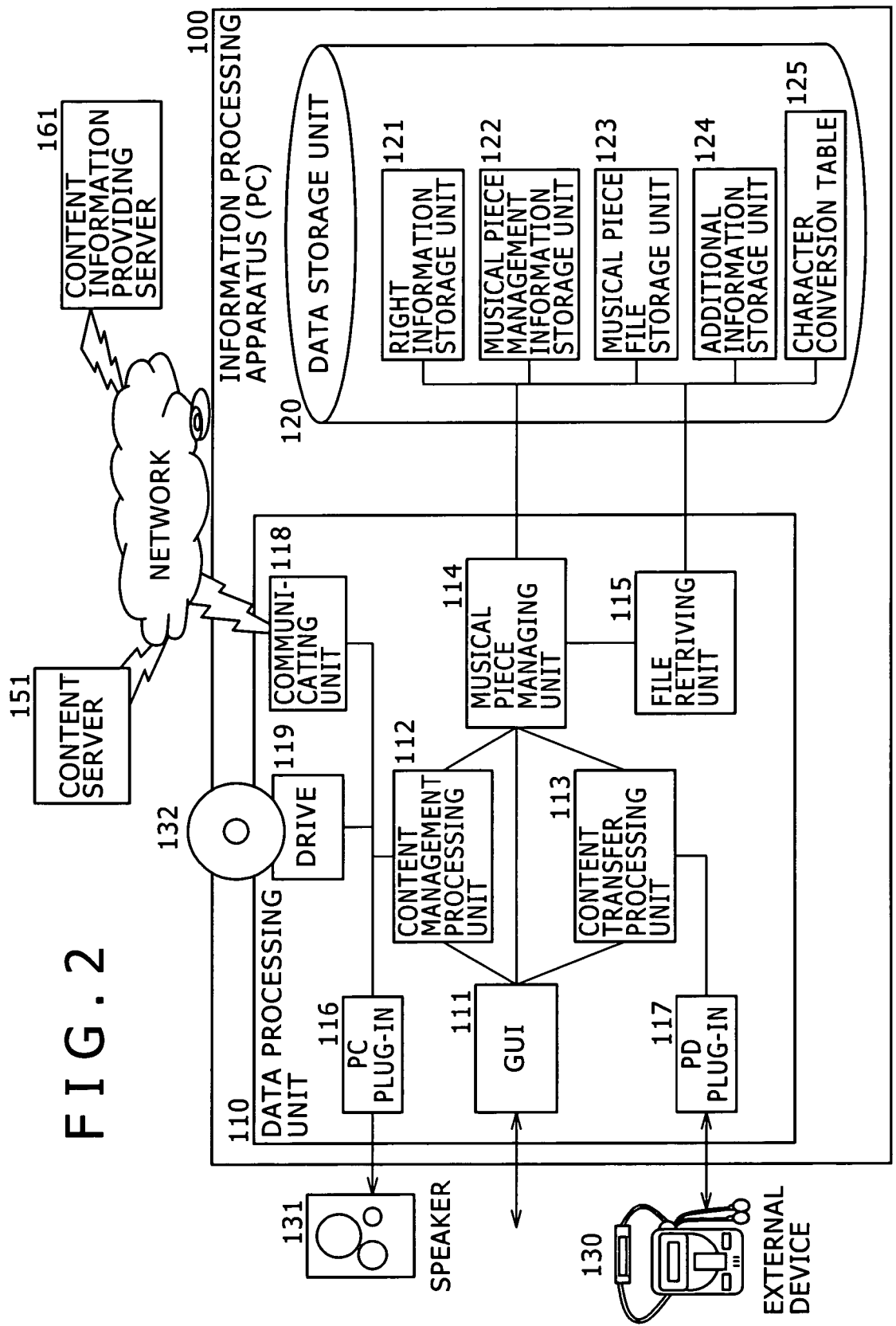

FIG.3A

| ID | MUSICAL PIECE NAME/ALBUM NAME | ARTIST NAME | ARTIST INITIAL LETTER | GENRE | MUSICAL PIECE FILE NAME |
|---|---|---|---|---|---|
| 1 | Album A | Jamiroquai | J | Funk | |
| 2 | Song-A | Jamiroquai | J | Funk | C:¥Root¥Song-A¥track.omg |
| 3 | Song-B | Jamiroquai | J | Funk | C:¥Root¥Song-B¥track.omg |
| 4 | Album B | The Beatles | B | Rock | |
| 5 | Song-C | The Beatles | B | Rock | C:¥Root¥Song-C¥track.omg |
| 6 | Album C | Miles Davis | M | Jazz | |
| 7 | Song-D | Miles Davis | M | Jazz | C:¥Root¥Song-D¥track.wav |
| .. | .. | .. | .. | .. | .. |

FIG.3B

| ID | PARENT ID |
|---|---|
| 2 | 1 |
| 3 | 1 |
| 5 | 4 |
| 7 | 6 |
| .. | .. |

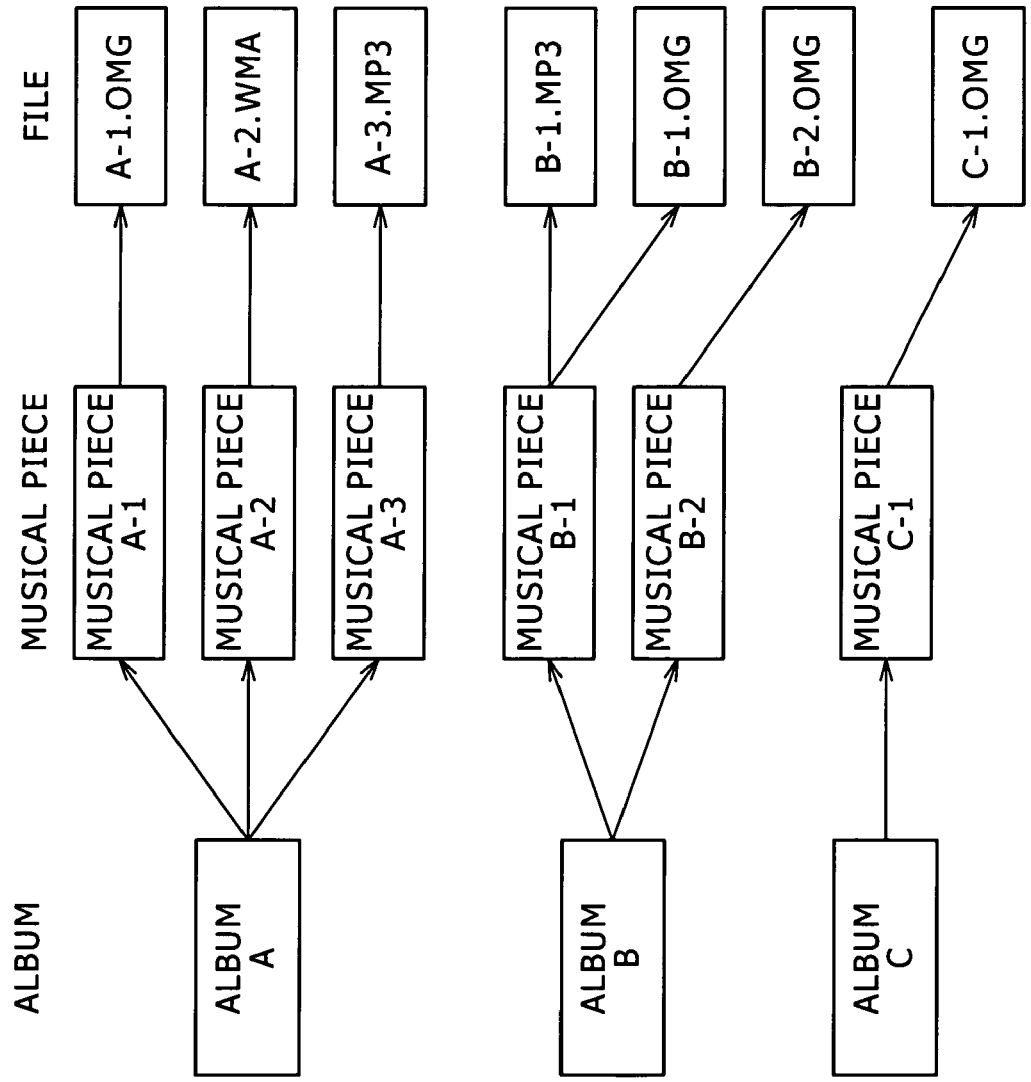

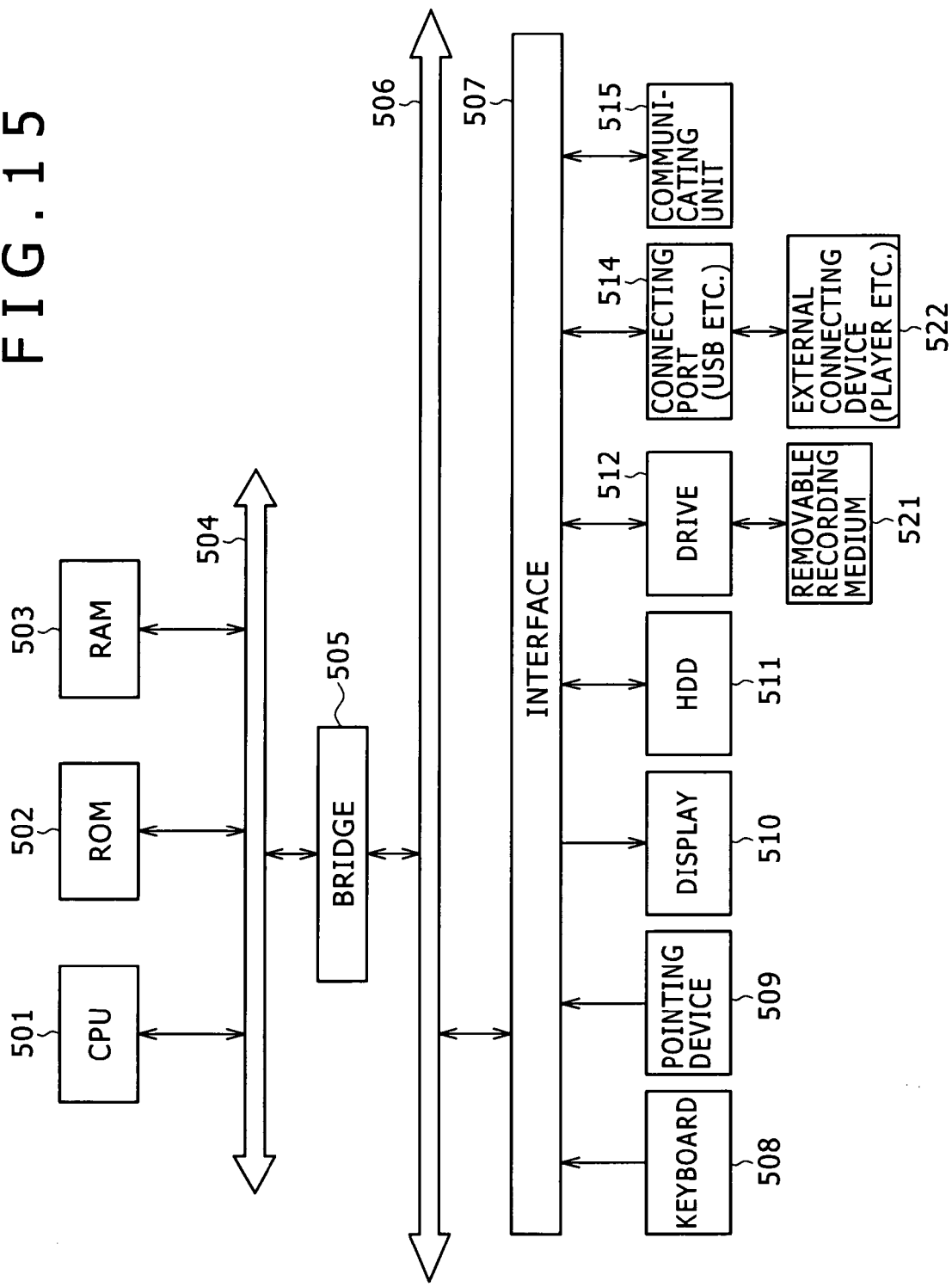

INFORMATION PROCESSING APPARATUS, INFORMATION PROCESSING METHOD, AND COMPUTER PROGRAM

TECHNICAL FIELD

The present invention relates to an information processing apparatus and an information processing method, and a computer program. More particularly, the present invention relates to an information processing apparatus and an information processing method, and a computer program that make it possible to easily extract contents desired by a user from a data storage unit storing a large number of musical contents and thus realize efficient content retrieval and management.

BACKGROUND ART

Recently, information processing apparatuses such as PCs, portable devices, and the like having a high-capacity storage unit such as a high-capacity hard disk, a DVD, or the like have spread. Many users using contents retain and manage a large amount of contents such as music data, image data, and the like in storage means. These pieces of data are stored as digital data compressed by for example MP3, ATRAC, or the like, and are encrypted as required and managed.

In addition, a form of use of contents is becoming common in which musical contents are downloaded from a music distribution server connected to a network and stored on a recording medium in a PC, and then output (checked out) to a portable device of a user when necessary to enjoy the contents being reproduced.

In such a form of use of contents, a large amount of contents is integrated and stored on a hard disk in a PC. As an application for performing processes of managing and reproducing such stored contents, there is a jukebox application typified by SonicStage (trademark), for example. Generally, such a content managing application manages contents by constructing a database relating content files, content attribute information, and content use right information set as required to each other. The content managing application allows content retrieval based on various attribute information, and implements a configuration for content use under a predetermined copyright management.

Such a jukebox application allows data retrieval and access based on various content information in order to improve retrievability when a large amount of albums including a plurality of musical pieces is stored within a database.

There is for example a jukebox application that allows retrieval and access with the name of an artist of an album as a key. Specifically, the jukebox application performs a retrieval process based on an artist name set as attribute information of an album stored in a database when a user inputs the artist name as a retrieving keyword, and performs a process of for example presenting information matching the input artist name on a display of a PC.

When musical contents are downloaded from a music distribution server and stored on a recording medium of the PC, for example, various attribute information and right information such as the name of an album, the name of an artist, musical piece length information, content use right information, and the like are provided to the user. Also, a process is performed to obtain content information recorded within a recording medium such as a CD or the like when contents are input from the CD and stored on the recording medium of the PC, or content information from an external server, and then store the content information as content management information in a storage unit of the PC. The jukebox application typified by SonicStage, for example, manages contents on the basis of the obtained information. Incidentally, Patent Document 1, for example, as a conventional technique discloses a process of obtaining content information.

However, content attribute information set in correspondence with musical data as content entities is generally full names of artists. The user is requested to input information corresponding to there pieces of set attribute information, that is, full names of artists as search keywords. However, users often do not remember spellings of foreign artists correctly, and there are not a few cases where users cannot remember names of even Japanese artists. In such cases, the function of data retrieval based on artist names cannot play its role sufficiently.

There is a retrieval service providing site that provides the service of a retrieval process based on an initial letter of an artist as an object of retrieval. In this case, however, since retrieval using an initial letter prepared in advance by a content provider as a key is performed, the name of an artist may not match with the user's intention, and thus retrieval that satisfies the user is not performed as intended.

An application performing data processing on contents managed by an individual such as the jukebox application typified by SonicStage, for example, requires a user to input an initial letter of each artist in order to enable retrieval using an initial letter. There is a method of using a first character of an artist name without managing initial letters separately. In this case, however, when only alphabetic characters A to Z, for example, are set as initial letter data, no alphabetic character can be associated with an artist written in Chinese characters or the like.

[Patent Document 1]
Japanese Patent Laid-open No. 2003-59244

DISCLOSURE OF INVENTION

The present invention has been made in view of the above problems, and it is an object of the present invention to provide an information processing apparatus and an information processing method, and a computer program that enable a data retrieval and a sort process based on an initial letter of an artist name, and enable retrieval and access intended by a user by allowing a process by a user of editing an initial letter of an artist name set in correspondence with each album in a configuration in which a large number of contents are integrated into a database and thus managed.

According to a first aspect of the present invention, an information processing apparatus includes: a data storage unit for storing a content file including content entity data and content management information; and a data processing unit for extracting an artist name from content attribute information as the content management information, determining initial letter information on a basis of the extracted artist name, and storing the content management information including the determined initial letter information as the content management information corresponding to the content file in the data storage unit.

Further, in one embodiment of the information processing apparatus according to the present invention, the data processing unit obtains content information stored on an information recording medium as a content input source, extracts the artist name from the obtained content information, and determines the initial letter information on the basis of the extracted artist name.

Further, in one embodiment of the information processing apparatus according to the present invention, the data processing unit extracts the artist name from content information received via a network, and determines the initial letter information on the basis of the extracted artist name.

Further, in one embodiment of the information processing apparatus according to the present invention, the data processing unit receives content information from a server providing service that is either TOC service or hash information service, extracts the artist name from the received content information, and determines the initial letter information on the basis of the extracted artist name.

Further, in one embodiment of the information processing apparatus according to the present invention, the data processing unit obtains content information based on a user input, extracts the artist name from the obtained content information, and determines the initial letter information on the basis of the extracted artist name.

Further, in one embodiment of the information processing apparatus according to the present invention, when a first character of the artist name is formed by an alphabetic character, the data processing unit determines the first character as an initial letter, and when the first character of the artist name is formed by a hiragana or katakana character, the data processing unit converts the first character into an alphabetic character on a basis of a character conversion table, and determines the converted character as an initial letter.

Further, in one embodiment of the information processing apparatus according to the present invention, the data processing unit performs an initial letter editing process of changing the initial letter information included in the content management information registered in the data storage unit on a basis of a user input, and registering the changed initial letter information.

Further, in one embodiment of the information processing apparatus according to the present invention, the data processing unit outputs an editing screen for editing content management information corresponding to one artist name from the content management information registered in the data storage unit to a display, changes initial letter information corresponding to the one artist name on a basis of a user input to the editing screen, and registers the changed initial letter information.

Further, in one embodiment of the information processing apparatus according to the present invention, the data processing unit outputs an editing screen for editing content management information corresponding to a plurality of artist names from the content management information registered in the data storage unit to a display, changes en bloc initial letter information corresponding to the plurality of artist names on a basis of user inputs to the editing screen, and registers en bloc the changed initial letter information.

Further, in one embodiment of the information processing apparatus according to the present invention, the data processing unit performs a data search process using initial letter information in the content management information registered in the data storage unit as a search key, and extracts and presents content management information in which initial letter information corresponding to user-input information is registered.

Further, according to a second aspect of the present invention, an information processing method for performing a process of registering content management information includes: a content attribute information obtaining step of obtaining content attribute information; an artist name extracting step of extracting an artist name from the content attribute information; an initial letter information determining step of determining initial letter information on a basis of the extracted artist name; and a content management information registering step of storing and registering content information including the determined initial letter information as content management information corresponding to a content file in a data storage unit.

Further, in one embodiment of the information processing method according to the present invention, the content attribute information obtaining step is a process to which either a process of obtaining the content information stored on an information recording medium as a source from which contents are obtained, or a process of obtaining the content information via a network, or a process of obtaining the content information on a basis of a user input is selectively applied.

Further, in one embodiment of the information processing method according to the present invention, the content attribute information obtaining step is a step of receiving the content information from a server providing service that is either TOC service or hash information service.

Further, in one embodiment of the information processing method according to the present invention, in the initial letter information determining step, when a first character of the artist name is formed by an alphabetic character, the first character is determined as an initial letter, and when the first character of the artist name is formed by a hiragana or katakana character, the first character is converted into an alphabetic character on a basis of a character conversion table, and the converted character is determined as an initial letter.

Further, in one embodiment of the information processing method according to the present invention, the information processing method further includes a step of performing an initial letter editing process of changing the initial letter information included in the content management information registered in the data storage unit on a basis of a user input, and registering the changed initial letter information.

Further, in one embodiment of the information processing method according to the present invention, the information processing method further includes a step of outputting an editing screen for editing content management information corresponding to one artist name from the content management information registered in the data storage unit to a display, changing initial letter information corresponding to the one artist name on a basis of a user input to the editing screen, and registering the changed initial letter information.

Further, in one embodiment of the information processing method according to the present invention, the information processing method further includes a step of outputting an editing screen for editing content management information corresponding to a plurality of artist names from the content management information registered in the data storage unit to a display, changing en bloc initial letter information corresponding to the plurality of artist names on a basis of user inputs to the editing screen, and registering en bloc the changed initial letter information.

Further, in one embodiment of the information processing method according to the present invention, the information processing method further includes a step of performing a data search process using initial letter information in the content management information registered in the data storage unit as a search key, and extracting and presenting content management information in which initial letter information corresponding to user-input information is registered.

Further, according to a third aspect of the present invention, a computer program for performing a process of registering content management information includes: a content attribute information obtaining step of obtaining content attribute information; an artist name extracting step of extracting an artist name from the content attribute information; an initial letter information determining step of determining initial letter information on a basis of the extracted artist name; and a content management information registering step of storing and registering content information including the determined initial letter information as content management information corresponding to a content file in a data storage unit.

The computer program according to the present invention can for example be provided to a computer system capable of executing various program codes by a recording medium provided in a computer readable form, or a communicating medium, for example a recording medium such as a CD, an FD, an MO or the like, or a communicating medium such as a network or the like. The program in a computer readable form realizes a process in accordance with the program on the computer system.

Other and further objects, features, and advantages of the present invention will become apparent from more detailed description on the basis of accompanying drawings and embodiments of the present invention to be described later. It is to be noted that a system in the present specification is a logical set configuration of a plurality of apparatus, and that each component apparatus is not necessarily within an identical casing.

According to the constitution of the present invention, content attribute information is obtained via a recording medium such as a CD or the like, a network, or as user input data, an artist name is extracted from the obtained content attribute information, initial letter information is determined on a basis of the artist name, and content information including the initial letter information is stored and registered in a data storage unit as content management information corresponding to a content file. Therefore a data search process using the initial letter information in the content management information as a search key and a sort process are made possible.

Further, according to the constitution of the present invention, the content management information including the initial letter information of the artist name is automatically determined and registered regardless of a kind of the artist name such as the alphabet, kana, or katakana. Therefore a process is made possible which generates and registers the management data efficiently and quickly and hence reduces a burden on the user.

Further, according to the constitution of the present invention, the content information including the initial letter information of the artist name is stored and registered in the data storage unit as the content management information corresponding to the content file, and editing including a process of changing the registered information is made possible. Therefore, even when there is registered data that does not suit an image of the user as a result of the automatic registration, the data can be changed and set, so that management data respecting an intention of the user can be generated and registered.

BRIEF DESCRIPTION OF DRAWINGS

FIG. 1 is a diagram illustrating a form of use of an information processing apparatus managing content data according to the present invention which apparatus;

FIG. 2 is a diagram of assistance in explaining processing functions of the information processing apparatus according to the present invention;

FIGS. 3A and 3B are diagrams showing an example of an album/musical piece table and an ID correspondence table;

FIG. 4 is a diagram of assistance in explaining relations between albums, musical pieces, and musical piece files;

FIG. 15 is a diagram showing an example of a hardware configuration of the information processing apparatus according to the present invention.

BEST MODE FOR CARRYING OUT THE INVENTION

Figure 5:
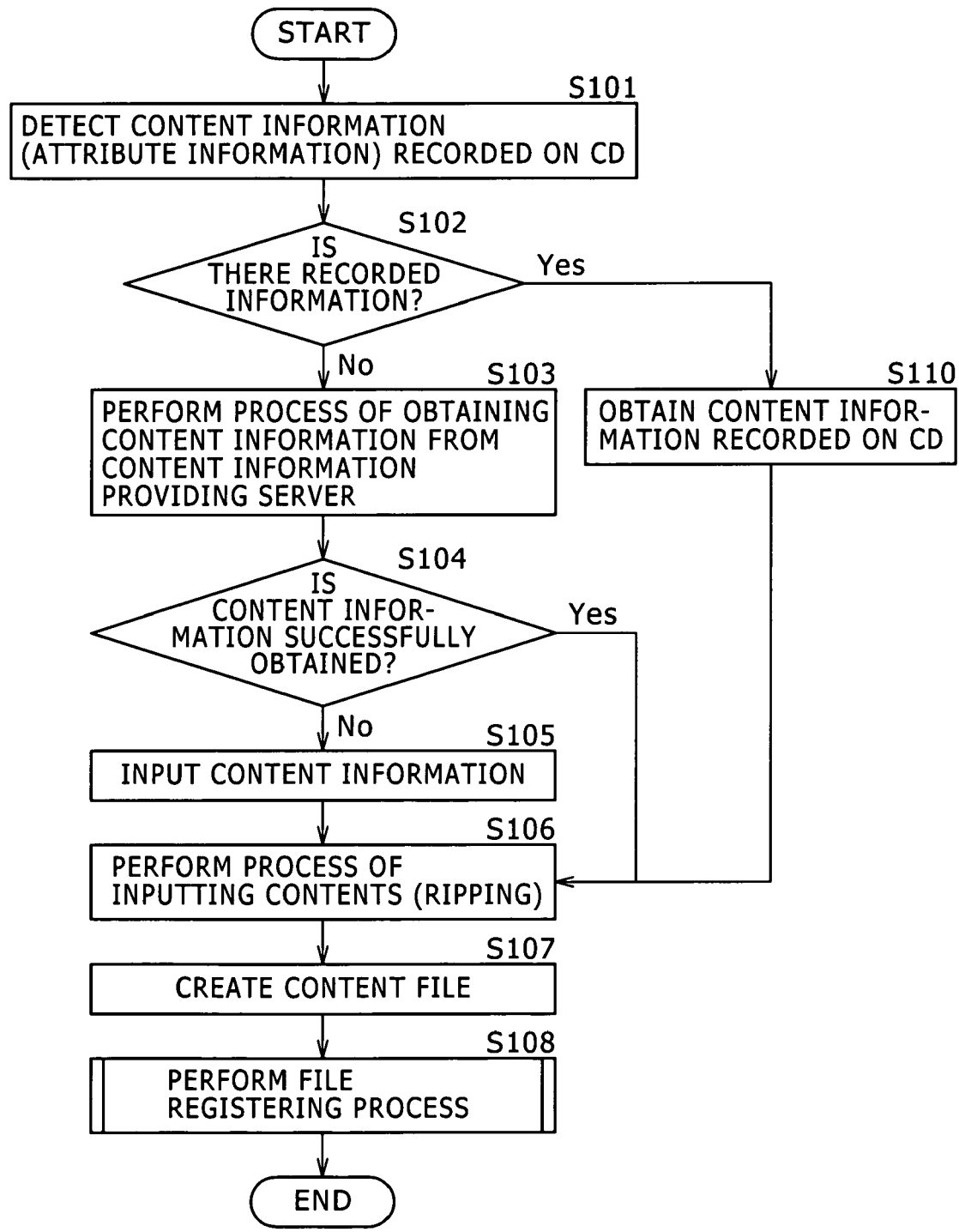
FIG. 5 is a flowchart of assistance in explaining a content registering process procedure for inputting contents from a CD, and storing the input contents and content information such as the name of an album and the like in a data storage unit.

FIG. 1 is a diagram illustrating a form of use of an information processing apparatus for managing content data according to the present invention. The information processing apparatus 100 is formed by a personal computer, for example. The information processing apparatus 100 has a data storage unit 120 for storing musical data, management information, and the like. The information processing apparatus 100 is connected to a network including a local area network, the Internet, or the like.

The information processing apparatus 100 records, in the data storage unit 120, musical contents received from content servers 151 and 152 such as EMD (Electronic Music Distribution) servers or the like connected to the network, or musical contents read from an information recording medium such as a CD (Compact Disc) or the like. Incidentally, the recording data is recorded after being subjected to an encoding process of MP3 or ATRAC3, for example, and further subjected to an encryption process as required.

The content servers 151 and 152 transmit for example musical data as contents, attribute information corresponding to the contents, and right information related to use of the contents via the network in response to a request from the information processing apparatus 100. The attribute information includes the name of an album, the name of an artist, the names of musical pieces stored on the album, information on lengths of the musical pieces, and the like. The information processing apparatus 100 stores the contents downloaded from these servers in the data storage unit 120, and also stores the various attribute information corresponding to the downloaded contents and the right information together with the contents. The attribute information includes the name of the album, the name of the artist, the information on the lengths of the musical pieces, the right information on the use of the contents, and the like.

The right information includes for example information on the number of check-outs as information limiting the number of portable devices (PDs) that can simultaneously use the contents corresponding to the right information, and information indicating whether the contents can be copied.

The information processing apparatus 100 can output (check out) the contents to a portable device 130 via a USB cable or the like together with for example the management information and the right information associated with the contents. However, this check-out process is carried out under control based on the right information corresponding to the contents.

On a commercial CD album or the like storing a plurality of pieces of musical data as digital data, information such as the number of tracks recorded on the CD, a start position, a length of a data area of each musical piece, and the like is recorded in advance as index information. This information is generally referred to as TOC (Table Of Contents) information.

There is musical piece information providing service based on TOC (Table Of Contents) information as an information providing service via the Internet or the like. The information processing apparatus 100 transmits TOC information recorded on a CD to a content piece information providing server 161. Thus, the information processing apparatus 100 can obtain musical piece information corresponding to the TOC stored on the CD, for example the names of a title and an album, the name of an artist, and a track number. Many jukebox applications such as Windows Media Player, Real-One, SonicStage, and the like provide information providing service using TOC information service such as CDDB2 or the like. The information processing apparatus 100 stores the information obtained from the server as management data corresponding to the contents in the data storage unit 120.

Further, the information processing apparatus 100 generates hash data from waveform data of one musical piece unit, that is, each piece of musical piece data, and then transmits the generated hash data to the content piece information providing server 161. The server side identifies a musical piece on the basis of the hash data. The information processing apparatus 100 receives the names of a title and an album, the name of an artist, a track number, and the like as musical piece information, and then stores the musical piece information as management data corresponding to the contents in the data storage unit 120.

Processing functions of the information processing apparatus according to the present invention will next be described with reference to FIG. 2. The information processing apparatus 100 has a data processing unit 110 and the data storage unit 120. The data processing unit includes a GUI unit 111, a content management processing unit 112, a content transfer processing unit 113, a musical piece managing unit 114, a file retrieving unit 115, a PC plug-in 116, a PD plug-in 117, a communicating unit 118, and a drive 119. The data storage unit 120 stores a right information storage unit 121, a musical piece management information storage unit 122, a musical piece file storage unit 123, an additional information storage unit 124, and a character conversion table 125.

The data processing unit 110 includes a CPU for performing data processing according to a computer program, a RAM and a ROM as storage areas for programs and parameters, and the like. Specific hardware configuration of the data processing unit 110 will be described later. Details of each block shown in FIG. 2 will be described in the following.

The GUI (Graphical User Interface) unit 111 generates various data input-output screens and presents the data input-output screens on a display. The GUI unit 111 functions as a data input unit and a data output unit. The data input unit corresponds to an operation of a keyboard or a mouse by a user. The data output unit displays various information such as content information, content reproduction state information, content download information, content transfer state information, and the like.

For example, the GUI unit 111 generates a process screen and presents the screen on the display. The process screen displays a process of capturing a musical piece from the information recording medium 132 (ripping) when an information recording medium 132 such as a CD or the like is loaded into the drive 119. The screen also displays a process of downloading contents from a content server.

Main functions of the content management processing unit 112 are to control a content downloading process, a content capturing process, and a content reproducing process.

The content management processing unit 112 performs for example a process of downloading contents specified by the user from the content server 151 or 152 via the communicating unit 118 on the basis of content specifying information specified by the user, for example URL information, and a process of inputting contents from the information recording medium 132 loaded in the drive 119. The downloaded contents or the input contents are stored in the musical piece file storage unit 123 of the data storage unit 120 via the musical piece managing unit 114.

The content management processing unit 112 also performs content reproduction. In response to a reproduction request input via the GUI unit 111, the content management processing unit 112 outputs a content identifier (content ID) as content specifying information to the musical piece managing unit 114. The musical piece managing unit 114 obtains a file name corresponding to the content identifier (content ID), and then provides a musical piece file obtained by file retrieval performed by the file retrieving unit 115 to the content management processing unit 112. The content management processing unit 112 controls reproduction of the obtained content file. Incidentally, this reproduction control is performed on the basis of right information of the contents.

The musical piece managing unit 114 for example performs a process of obtaining various data stored in the data storage unit 120, for example obtaining musical piece management information, a musical piece file, right information, or additional information such as a jacket image, lyric information, and the like in response to a user input via the GUI unit 111. For example, when a request to obtain musical piece information is made via the GUI unit 111, the musical piece managing unit 114 obtains content information such as content IDs, the names of albums, the names of musical pieces, the names of artists, initial letters of the names of the artists, and the like from the musical piece management information storage unit 122 of the data storage unit 120 in response to the user request. The musical piece managing unit 114 supplies the content information to the GUI unit 111. The GUI unit displays the information on the display.

When the user selects a specific content from the content information displayed on the display, and then inputs a reproduction request, the GUI unit 111 supplies a musical piece ID corresponding to contents requested to be reproduced to the content management processing unit 112, and thereby requests reproduction of the contents. The contents are reproduced via the PC plug-in 116.

At the time of the content reproduction process, the musical piece managing unit 114 obtains a file name corresponding to the musical piece ID from the musical piece management information storage unit 122, makes the file retrieving unit 115 obtain a file on the basis of the file name, and then obtains the content file from the musical piece file storage unit 123. The musical piece managing unit 114 outputs the obtained musical piece file to the content management processing unit 112. The content management processing unit 112 outputs the obtained contents to an external output device (for example a speaker 131) via the PC (Protected Content) plug-in 116.

Incidentally, in the content reproduction process, reproduction is performed after a decoding process corresponding to an encryption mode and an encoding mode of the contents is performed.

When a request for a process of outputting contents to the external device 130 such as a portable device (PD) or the like (check-out) or inputting contents from the external device 130 (check-in) is input by a user operation via the GUI unit 111, the GUI unit 111 supplies a musical piece ID corresponding to the contents requested to be transferred to the content transfer processing unit 113, and thereby requests transfer of the contents. The contents are transferred via the PD plug-in 117.

When the content transfer processing unit 113 receives the musical piece ID from the GUI unit 111 and is thus requested to transfer the contents, the content transfer processing unit 113 supplies the musical piece ID to the musical piece managing unit 114. The musical piece managing unit 114 obtains a file name corresponding to the musical piece ID from the musical piece management information storage unit 122, makes the file retrieving unit 115 obtain a file on the basis of the file name, and then obtains the content file from the musical piece file storage unit 123. The musical piece managing unit 114 outputs the obtained musical piece file to the content transfer processing unit 113. The content transfer processing unit 113 supplies the obtained contents to the PD plug-in 117. At the time of transferring the contents to the external device 130 such as the portable device or the like, the PD plug-in 117 performs mutual authentication, and transfers the contents on condition that the authentication is established.

In response to a process request from the GUI unit 111, the content management processing unit 112, or the content transfer processing unit 113, the musical piece managing unit 114 performs a process of for example obtaining, updating, or deleting data from the data storage unit 120.

For example, on the basis of a musical piece ID specified from the content management processing unit 112 or the content transfer processing unit 113, the musical piece managing unit 114 obtains a content file name corresponding to the musical piece ID from content management information stored in the musical piece management information storage unit 122. The musical piece managing unit 114 outputs an instruction to retrieve a musical piece file on the basis of the file name to the file retrieving unit 115. The musical piece managing unit 114 supplies the musical piece file obtained by the file retrieving unit 115 from the musical piece file storage unit 123 to the content management processing unit 112 or the content transfer processing unit 113.

The musical piece managing unit 114 further performs a process of inputting contents downloaded by the content management processing unit 112 from an external server and contents input from an information recording medium such as a CD or the like into the data storage unit 120.

In this data storing process, the musical piece managing unit 114 generates a content file according to a data format of MP3, OMG, WMA, or the like, and then stores the content file in the musical piece file storage unit 123. In addition to the entity data of the contents, the musical piece managing unit 114 stores attribute information of the contents, such for example as the name of a musical piece, the name of an album, and the name of an artist, in the musical piece management information storage unit 122. Further, the musical piece managing unit 114 stores right information as information on a right to use of the contents in the right information storage unit 121, and stores additional information such as a jacket image, lyric data, and the like in the additional information storage unit 124.

In addition, on the basis of a process request input from the user via the GUI unit 111, the musical piece managing unit 114 performs a process of recording, updating, or deleting data stored in the musical piece management information storage unit 122 of the data storage unit 120. The data includes content information such as the name of an album, the name of a musical piece, and the name of an artist corresponding to contents, the name of a file corresponding to the contents, and the like. The musical piece managing unit 114 also performs a process of reading these pieces of content information.

Further, in response to a data retrieval request from the GUI unit 111, the musical piece managing unit 114 retrieves data on the basis of information recorded in the musical piece management information storage unit 122. The musical piece managing unit 114 thereby reads content attribute information such as the name of an album, the name of an artist, the name of a musical piece, a musical piece ID, and the like as a result of the retrieval from the musical piece management information storage unit 122, and then supplies the content attribute information to the GUI unit 111.

In response to a request from the musical piece managing unit 114, on the basis of a file name obtained from the musical piece management information storage unit 122 of the data storage unit 120, the file retrieving unit 115 retrieves a content storing file corresponding to the file name from the musical piece file storage unit 123. The file retrieving unit 115 supplies the file read from the musical piece file storage unit 123 to the musical piece managing unit 114.

The musical piece managing unit 114 supplies the content storing file supplied from the file retrieving unit 115 to the content management processing unit 112 or the content transfer processing unit 113.

The data storage unit 120 stores the right information storage unit 121, the musical piece management information storage unit 122, the musical piece file storage unit 123, the additional information storage unit 124, and the character conversion table 125.

The musical piece management information storage unit 122 stores data on contents, for example musical piece IDs, the names of albums, the names of musical pieces, the names of artists, initial letter information of the artists, content file names, and various other content information. The musical piece management information storage unit 122 for example constructs a relational database including a plurality of management tables to manage contents. Specifically, the musical piece management information storage unit 122 manages data by a plurality of tables such as an album/musical piece table in which albums and musical pieces are set as main managing items, a file table in which file names are set as main managing items, and the like.

FIG. 3A shows an example of the album/musical piece table. As shown in FIG. 3A the album/musical piece table includes corresponding data of items such for example as an ID set to an album or a musical piece, the name of the album, the name of the musical piece, the name of an artist, an initial letter of the artist, the name of a genre, and the name of a musical piece file.

The ID is an identifier set in correspondence with an album or a musical piece. The ID is a unique identifier set to each album or each musical piece and enabling each album or each musical piece to be identified.

Relations between albums, musical pieces, and musical piece files will be described with reference to FIG. 4. An album is set as a set of a plurality of musical pieces of a single artist, for example. However, this is not essential; an album including a single musical piece may be set. A musical piece is set as a child of an album. Each musical piece is stored as a musical piece file in accordance with various data formats (OMG, MP3, WMA, or the like) and as a data file for each musical piece in the musical piece file storage unit 123 shown in FIG. 2.

An item [ID] set in the album/musical piece table shown in FIG. 3A is an identifier set in correspondence with an album or a musical piece. As described with reference to FIG. 4, an album and a musical piece are set in a relation of a parent and a child, respectively. As shown in FIG. 3B, the musical piece management information storage unit 122 stores an ID correspondence table showing parent-child relations of IDs. A process of identifying an album from a musical piece and a process of identifying musical pieces included in an album from the album are made possible on the basis of this ID correspondence table. For example, even when retrieval based on a specification of a musical piece ID is performed, an album ID corresponding to the musical piece ID is extracted by referring to the ID correspondence table, and thus album information is obtained.

In addition to the ID, items set in the album/musical piece table shown in FIG. 3A include [album or musical piece name], [artist name], [artist initial letter], [genre name], and [musical piece file name].

In the example shown in FIG. 3A, a first entry, for example, shows that:

ID=1
Album name=AlbumA
Artist name=Jamiroquai
Artist initial letter=J
Genre name=Funk
Musical piece file name=No file name An album is a set of musical pieces, and no musical piece file name is set to an album.

In the example shown in FIG. 3A, a second entry shows that:

ID=2
Musical piece name=Song-A
Artist name=Jamiroquai
Artist initial letter=J
Genre name=Funk
Musical piece file name=C:/Root/Song-A/track.omg In the case of a musical piece, the name of a musical piece file stored in the musical piece file storage unit 123 is set to the musical piece.

The second entry in FIG. 3A has an ID=2, and hence an album ID=1 as a parent ID can be extracted on the basis of the ID correspondence table of FIG. 3B. It is also possible to conversely retrieve child musical pieces, that is, musical pieces included in the album on the basis of the album ID=1.

Returning to FIG. 2, description of the configuration of the information processing apparatus will be continued. The musical piece management information storage unit 122 stores the above-described content management information. The musical piece file storage unit 123 stores files in units of a musical piece. The files are stored in various formats such for example as MP3, ATRAC3, OMG, and WMA. An identical musical piece may be stored in different data formats. For example, for a musical piece B-1 as a child of an album B shown in FIG. 4, a data file B-1.MP3 in the MP3 format and a data file B-1.OMG in the OMG format are stored in the musical piece file storage unit 123.

The additional information storage unit 124 stores additional data corresponding to contents, such for example as jacket image data and lyric information, or recording date and time data.

The right information storage unit 121 stores right information corresponding to files complying with a standard defined by SDMI (Secure Digital Music Initiative), for example. The right information storage unit 121 retrieves one piece of right information corresponding to a musical piece ID when receiving the musical piece ID from the musical piece managing unit 114, and then supplies the retrieved right information to the musical piece managing unit 114. In a process for reproducing contents in the content management processing unit 112 or a process for transferring contents in the content transfer processing unit 113, use of the contents is controlled on the basis of the right information.

The character conversion table 125 is a conversion table of a Hepburn system, for example, for converting hiragana or katakana characters into the alphabet. This character conversion table is used to set initial letter information set in the content (musical piece) management information. A concrete process will be described later.

Processes performed in the information processing apparatus according to the present invention will next be described. Description will first be made of a process in registering a new content file, that is, storing the new content file in the data storage unit 120. Incidentally, contents are for example downloaded from a content server or input from various recording media such as a CD or the like.

FIG. 5 is a flowchart of assistance in explaining a content registering process procedure for inputting contents from a CD, and storing the input contents and content information such as the name of an album and the like in the data storage unit 120.

Figure 6:
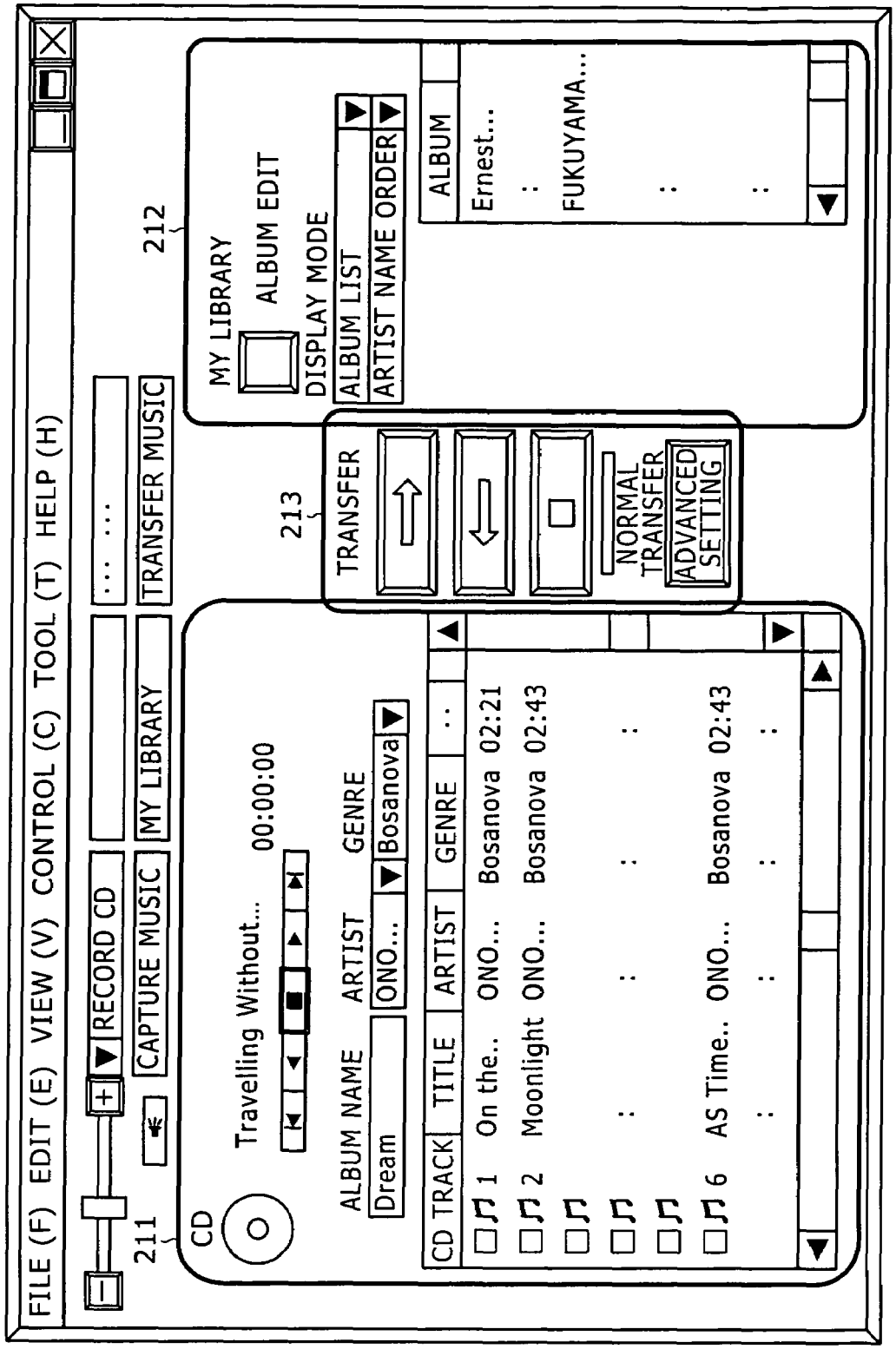
FIG. 6 is a diagram of assistance in explaining an example of a screen, which is generated by a GUI unit at the time of a ripping process, displayed on a display.

A process of inputting contents from a CD into a PC is referred to as a ripping process. FIG. 6 shows an example of a screen displayed on the display. The screen is generated by the GUI unit at the time of the ripping process. The displayed data includes: a CD information display unit 211 including a list of musical piece information stored on a CD, and the like; a my library information display unit 212 that can display information of a list of contents already stored in the data storage unit 120 such as a hard disk or the like on the information processing apparatus side; and an operating button display unit 213 for starting or stopping data transfer between the CD and the data storage unit 120 by a click operation or the like by the user.

In inputting contents from the CD (ripping), the user operates the operating button display unit 213 to thereby input the contents.

Data processing at the time of the content input process is performed by data processing units of the content management processing unit 112, the musical piece managing unit 114, and the GUI unit 111. It is to be noted that while the input of data via the drive 119 will be described in the following as one example of a content registering process, the data processing units of the content management processing unit 112, the musical piece managing unit 114, and the GUI unit 111 perform substantially the same process when the contents are input from a content server via the communicating unit 118, except that the source of the input data is different.

A process in each step of the flow of FIG. 5 will be described. In first step S101, content information recorded on the CD is detected. On some CDs, the name of the album, the name of an artist, the names of musical pieces, musical piece length information, and the like are recorded in the form of text data, for example, as content attribute information together with contents. The information processing apparatus 100 to perform the ripping process first performs a process of detecting whether such content information is recorded on the CD.

When such content information is recorded on the CD (step S102: Yes), the process proceeds to step S110, where the content information (attribute information), that is, the content information such as the name of the album, the name of an artist, the names of musical pieces, musical piece length information, and the like is captured from the CD into the information processing apparatus, and then stored in a RAM as a temporary memory area or a temporary storage area set in the hard disk. The process proceeds to step S106, where a process of inputting contents from the CD (ripping) is started. Incidentally, when content attribute information such for example as CD-TEXT or CD EXTRA is stored in advance on the CD, the attribute information data is obtained. When the contents are MP3 data, the attribute information data is obtained from an ID3 tag as tag data.

When such content information is not recorded on the CD (step S102: No), the process proceeds to step S103, where a process of obtaining content information from the content information providing server 161 is performed. An album CD storing a plurality of musical pieces generally has TOC information recorded thereon. Basically, TOC information is set in correspondence with an album CD storing a plurality of musical pieces. TOC information is data obtained by coding length (the number of frames on the CD) of each musical piece recorded on the CD, and can be represented by text data.

The following is a concrete example of TOC information.
[150 29343 52049 73471 92322 98519 119236 135071 158318 175367]

The above TOC information is data in which the number of frames of each musical piece is recorded:
The number of frames to a first musical piece: 150
The number of frames to a second musical piece: 29343
The number of frames to a third musical piece: 52049
The number of frames to a tenth musical piece: 175367

The number of frames is data corresponding to a play time of a musical piece included in an album. The content information providing server 161 receives this TOC information and can obtain content information as information registered in the TOC server, that is, information such as the name of the album, the name of an artist, the names of musical pieces, musical piece length information, and the like. However, when the TOC information matching the transmitted information is not registered in the content information providing server 161, the information cannot be received.

Incidentally, the content information may be obtained from a hash information service providing server in addition to the TOC service providing server.

When the process of obtaining the content information from the server is successfully performed in step S103 (step S104: Yes), the process proceeds to step S106 to start a process of inputting contents from the CD (ripping).

When the process of obtaining the content information from the server is failed in step S103 (step S104: No), the user inputs content information, that is, information such as the name of the album, the name of an artist, the names of musical pieces, and the like in step S105. Thereafter the process proceeds to step S106 to start a process of inputting contents from the CD (ripping).

After the process of inputting contents from the CD is started in step S106, a content file is generated in step S107, and the generated content file is stored in the musical piece file storage unit 123 of the data storage unit 120.

Further, a file registration process is performed in step S108. The file registration process is a process of generating and registering management data corresponding to the content file stored in the musical piece file storage unit 123, that is, data to be stored in the musical piece management information storage unit 122. The file registration process is for example a process of generating an entry for the album/musical piece table described earlier with reference to FIG. 3.

Incidentally, the process described with reference to FIG. 5 is a process of inputting contents from a CD. Also in inputting contents from a content server, after a content entity and information such as the name of an album, the name of an artist, the names of musical pieces, musical piece length information, and the like as content attribute information are obtained from the content server or the content information providing server. The content file is stored in the musical piece file storage unit 123. The process in step S108, that is, the file registration process for registering management data corresponding to the stored content file is performed.

Figure 7:
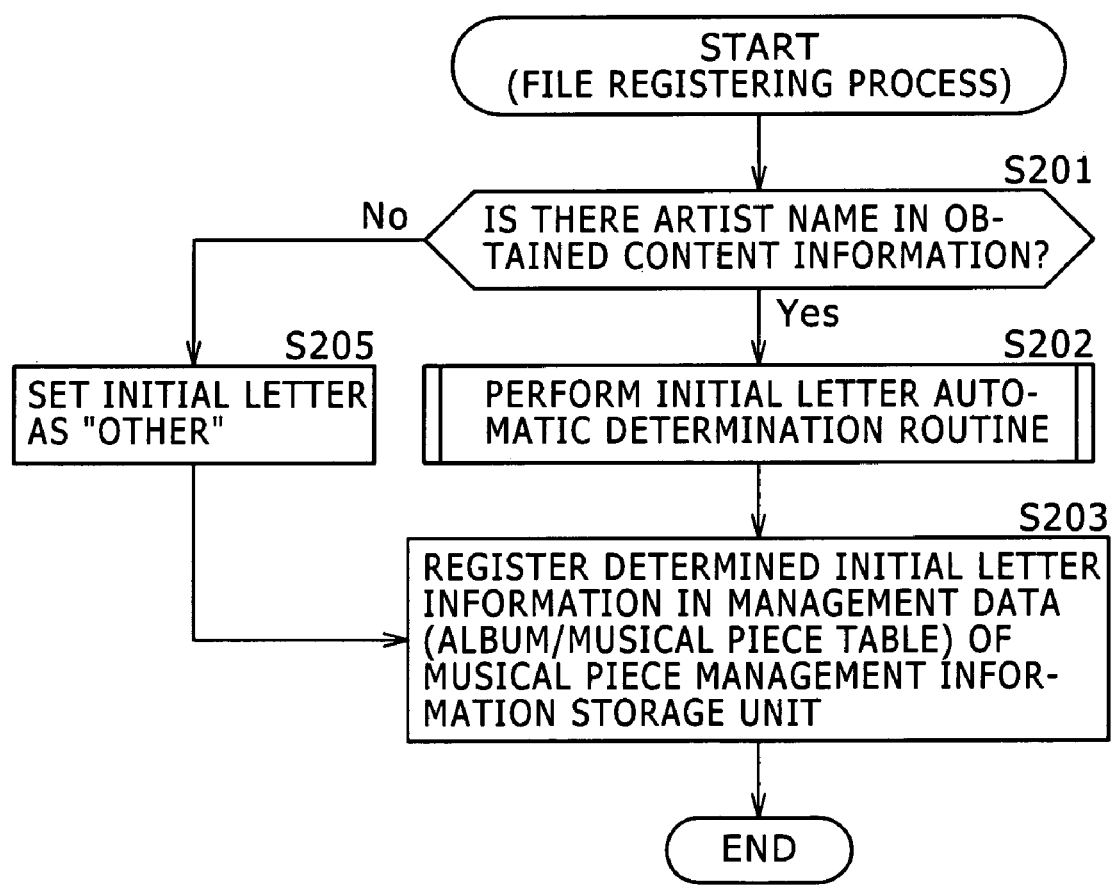
FIG. 7 is a flowchart of assistance in explaining details of a file registration process.

Details of the file registration process will be described with reference to a flowchart of FIG. 7. In first step S201, whether the name of an artist is included in the content information obtained from the CD or the external server, or by user input is determined. When the name of an artist is included in the content information, the process proceeds to step S202 to perform an initial letter automatic determination routine.

The initial letter automatic determination routine is a process of determining an initial letter corresponding to the name of an artist as content management information corresponding to the content file (musical piece file) stored in the musical piece file storage unit 123. Details of the initial letter automatic determination routine will be described later.

When the initial letter is determined in step S202, the process proceeds to step S203, where the determined initial letter information is registered as management data in the musical piece management information storage unit 122. That is, a process is performed to store content management information including the determined initial letter information in the musical piece management information storage unit 122 of the data storage unit 120 as content management information corresponding to the content file stored in the musical piece file storage unit 123.

For example, the determined initial letter is registered as artist initial letter information in the album/musical piece table shown in FIG. 3A, and stored in the musical piece management information storage unit 122. Incidentally, in this case, the name of the artist included in the content information obtained from the CD or the external server, or by user input is registered as an artist name in the album/musical piece table shown in FIG. 3A.

When no artist name is included in the content information obtained from the CD or the external server, or by user input in step S201, the process proceeds to step S205, where "other" is set as an initial letter. The process then proceeds to step S203, where the determined initial letter information="other" is registered as management data. For example, "other" is registered as artist initial letter information in the album/musical piece table shown in FIG. 3A.

Incidentally, an artist name field in this case is blank (no registered information) in the album/musical piece table shown in FIG. 3A.

Incidentally, a data retrieval or sort process is made possible on the basis of the musical piece management information data thus stored in the musical piece management information storage unit 122 of the data storage unit 120. For example, a data retrieval process can be performed with initial letter information in registered content management information used as a search key, and a sort process can be performed to present entries in alphabetical order by initial letter, for example.

When information, for example a component letter of the alphabet is input by the user via the GUI unit 111, the musical piece managing unit 114 retrieves data stored in the musical piece management information storage unit 122 to extract content management information in which initial letter information corresponding to the letter information input by the user is registered, and then presents the content management information to the user via the GUI unit 111. Incidentally, in presenting the information, the information sorted in alphabetical order is presented. An example of presenting the information will be described later.

Figure 8:
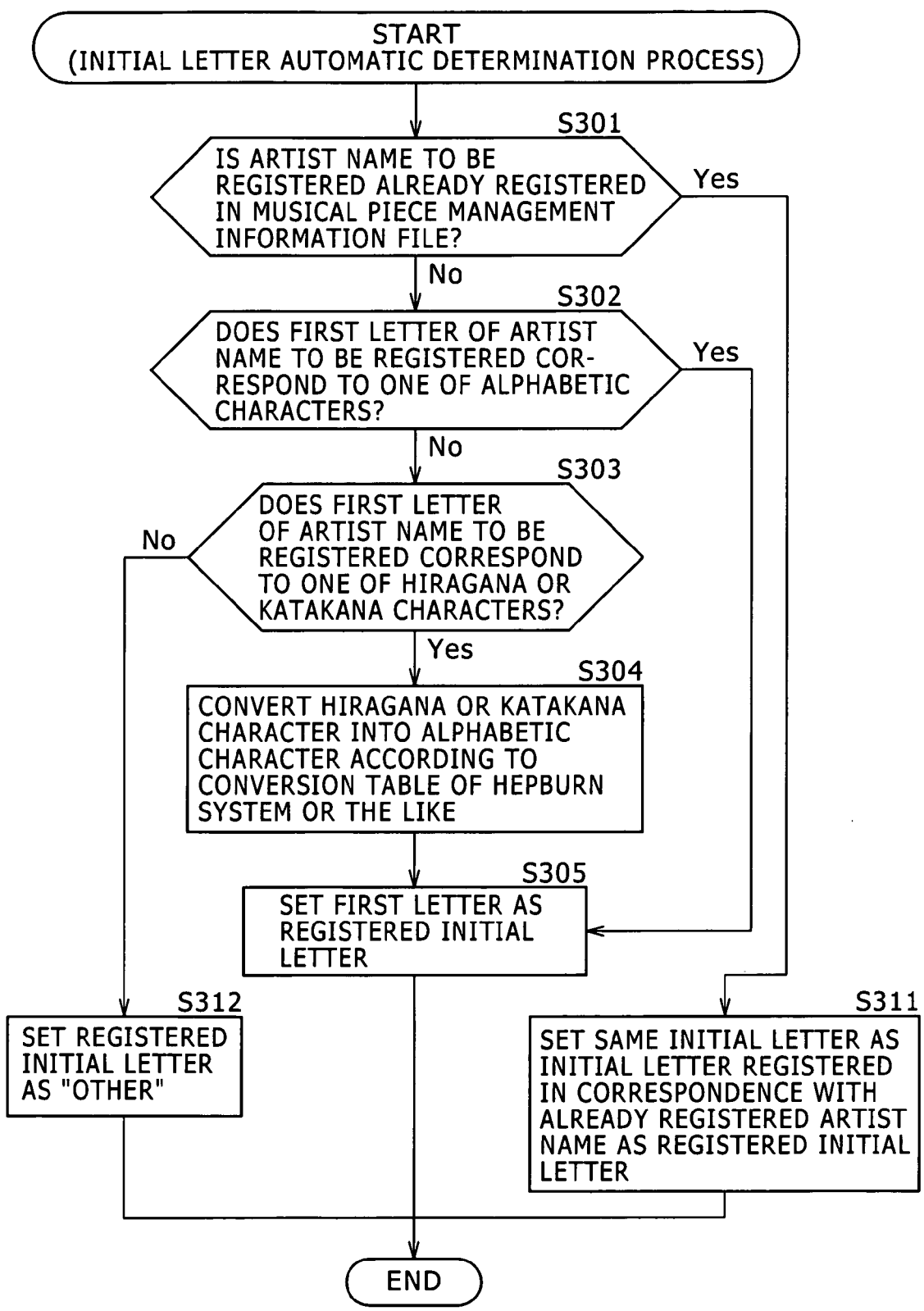
FIG. 8 is a flowchart of assistance in explaining a detailed process sequence of an initial letter automatic determination routine.

Details of the initial letter automatic determination routine performed in step S202 will next be described with reference to FIG. 8.

In first step S301, whether an artist name to be registered is present as data already registered in the musical piece management information storage unit 122 is determined. This is performed as a process of determining whether the same artist name is already registered in the album/musical piece table shown in FIG. 3A, for example. If the same artist name is registered, it is determined that the same artist name is registered even when albums and musical pieces are different. When it is determined that the same artist name is registered, the process proceeds to step S311, where the same initial letter as an initial letter registered in correspondence with the already registered artist name is set as the registered initial letter of management information (a new entry set in the album/musical piece table shown in FIG. 3A) corresponding to the newly set content file.

When it is determined in step S301 that the artist name to be registered is not registered in a musical piece management information file, the process proceeds to step S302 to determine whether a first character of the artist name to be registered corresponds to one of alphabetic characters. The artist name subjected to the determination is included in the content information obtained from the CD or the external server, or by user input as content information corresponding to the newly generated content file.

When the first character of the artist name to be registered corresponds to one of the alphabetic characters, the process proceeds to step S305 to set the first character of the artist name to be registered, that is, one of the alphabetic characters as a registered initial letter.

When the first character of the artist name to be registered does not correspond to any of the alphabetic characters, the process proceeds to step S303 to determine whether the first character of the artist name to be registered corresponds to one of hiragana characters or katakana characters. When the first character of the artist name to be registered corresponds to one of hiragana characters or katakana characters, the process proceeds to step S304 to convert the hiragana character or the katakana character into the alphabet according to a conversion table of the Hepburn system or the like. Incidentally, the character conversion table 125 (see FIG. 2) stored in advance in the data storage unit within the information processing apparatus is applied as a conversion table.

In step S305, one of the alphabetic characters the first character converted according to the character conversion table is set as a registered initial letter. In this case, hiragana or katakana data is registered as the artist name of the new entry set in the album/musical piece table shown in FIG. 3A, while one of the alphabetic characters is registered as the initial letter information of the new entry.

When it is determined in step S303 that the first character of the artist name to be registered does not correspond to any of the hiragana characters or the katakana characters, the process proceeds to step S312 to set a registered initial letter as "other." In this case, data, for example Chinese character data other than alphabetic characters, hiragana, or katakana is registered as the artist name of the new entry set in the album/musical piece table shown in FIG. 3A, while "other" is registered as the initial letter information of the new entry.

Description will next be made of a process sequence for changing already registered management information, that is, data stored in the musical piece management information storage unit 122 shown in FIG. 2, for example data already registered in the album/musical piece table shown in FIG. 3A.

Figure 9:
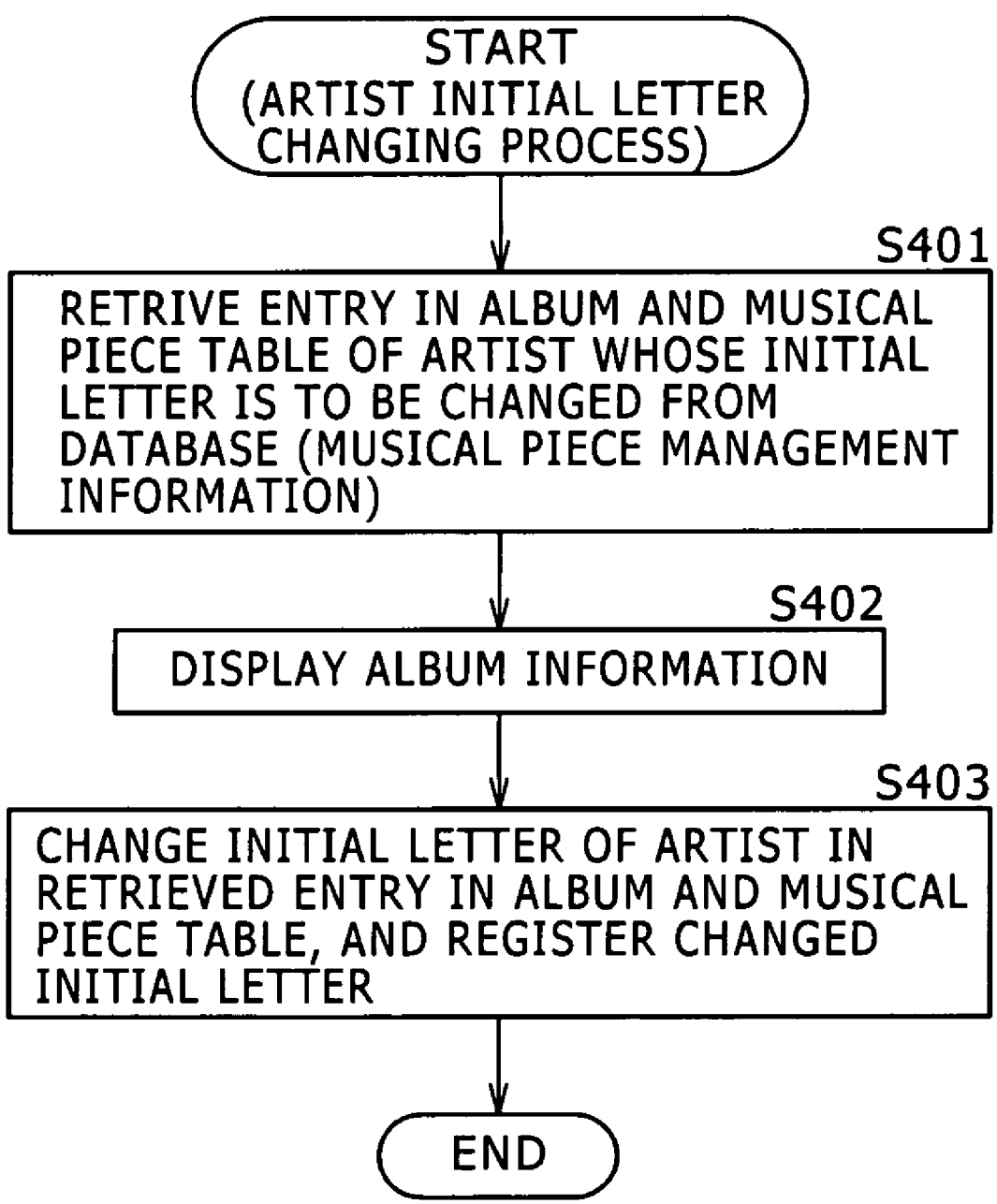
FIG. 9 is a flowchart of assistance in explaining a process for changing a registered initial letter corresponding to one artist name from registered data.

Referring to FIG. 9, description will first be made of a process for changing a registered initial letter corresponding to one artist name from the registered data. This process is useful for example when the user changes automatically registered initial letter data of "other" in a case of a Chinese character artist whose initial letter is registered as "other" in the above-described initial letter automatic determination routine. Alternatively, the process is useful as a changing process for example when an initial letter registered in the initial letter automatic determination routine does not suit an image of the user. For example, "T" is registered as a registered initial letter of "The Beatles" in the above-described initial letter automatic determination routine. The changing process is used when this initial letter "T" is desired to be changed to "B."

Each step of a flow shown in FIG. 9 will be described. In first step S401, an entry in the album and musical piece table of an artist whose initial letter is to be changed is retrieved from the database (musical piece management information). The musical piece managing unit 114 outputs an instruction for retrieval to the file retrieving unit 115 on the basis of information input by the user via the GUI unit 111, and the data stored in the musical piece management information storage unit 122 is obtained on the basis of the instruction.

In step S402, the extracted album information is displayed. The data obtained in step S401 is sent from the musical piece managing unit 114 to the GUI unit 111. The GUI unit 111 generates display data, and then presents the display data on the display.

Figure 10:
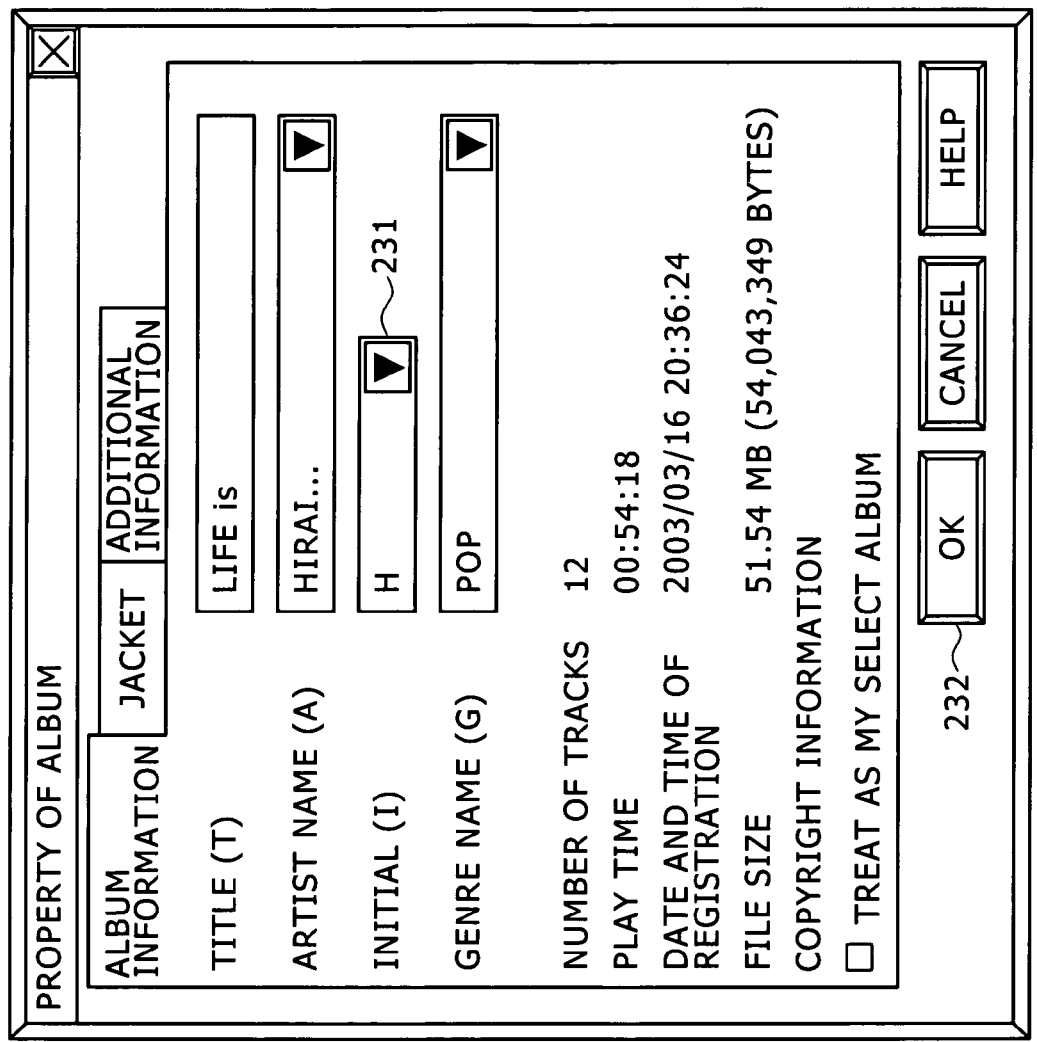
FIG. 10 is a diagram showing an example of album information displayed when a registered initial letter corresponding to one artist name from registered data is changed.

FIG. 10 shows an example of the displayed album information. The displayed album information includes registered data of items of one entry (an entry corresponding to an album) registered in the album/musical piece table shown in FIG. 3A. The user can change these pieces of registered data. Incidentally, INITIAL (I) is an initial letter.

In the example shown in FIG. 10, the name of an artist is "HIRAI..." (in Chinese characters), and thus the initial letter registered in the above-described initial letter automatic determination routine is "other."

In step S403, the user changes the initial letter of the artist in the retrieved entry in the album and musical piece table, and registers the changed initial letter. Specifically, the user changes the registered initial letter data at a data input part 231 in FIG. 10 to "H" as shown in the figure, for example, and then clicks an OK button 232, whereby the initial letter of the artist in the data entry already registered in the album/musical piece table shown in FIG. 3A can be changed and then registered.

Figure 11:
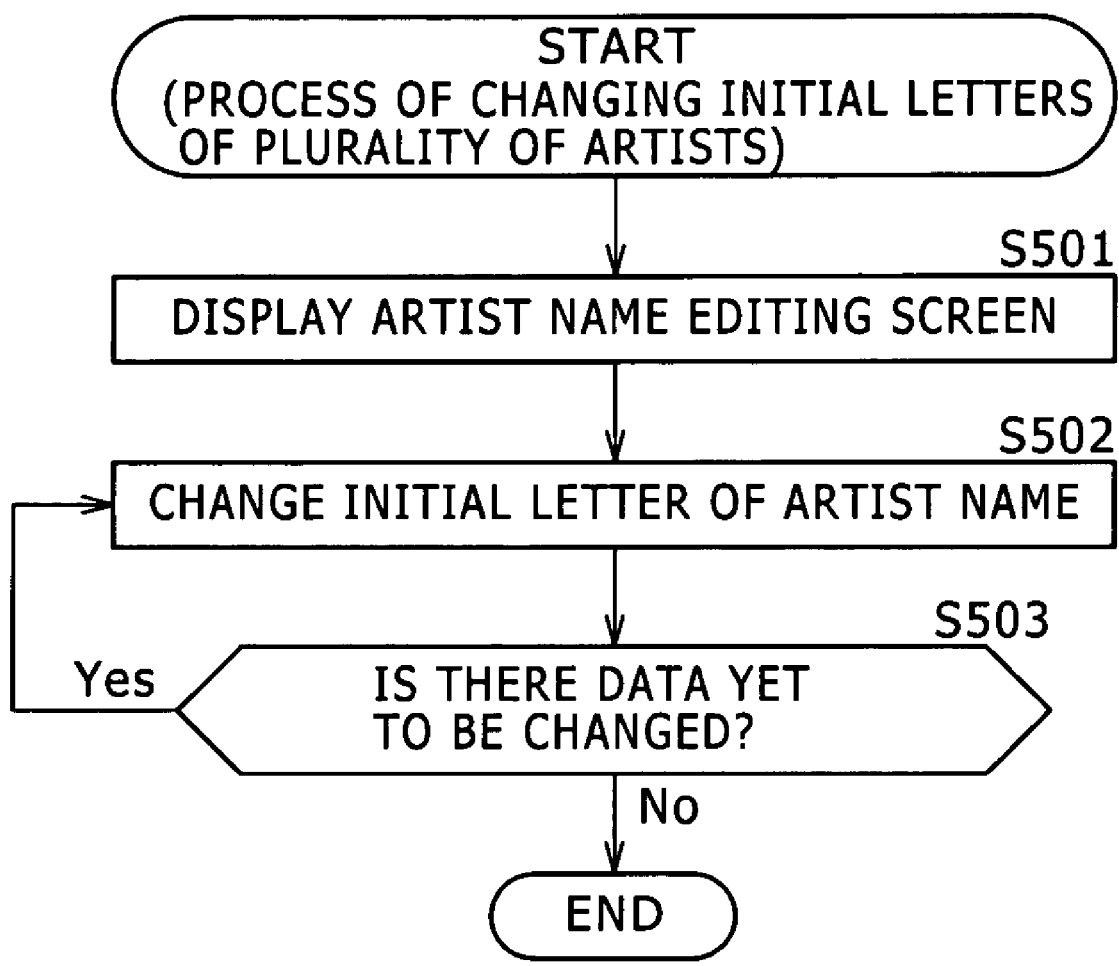
FIG. 11 is a flowchart of assistance in explaining a process for changing en bloc registered initial letters corresponding to a plurality of artist names from the registered data.

Referring to FIG. 11, description will next be made of a process for changing en bloc registered initial letters corresponding to a plurality of artist names from already registered data.

In first step S501, an artist name editing screen is displayed. The musical piece managing unit 114 obtains data stored in the musical piece management information storage unit on the basis of information input by the user via the GUI unit 111. The GUI unit 111 generates display data on the basis of the obtained information, and then presents the display data on the display.

Figure 12:
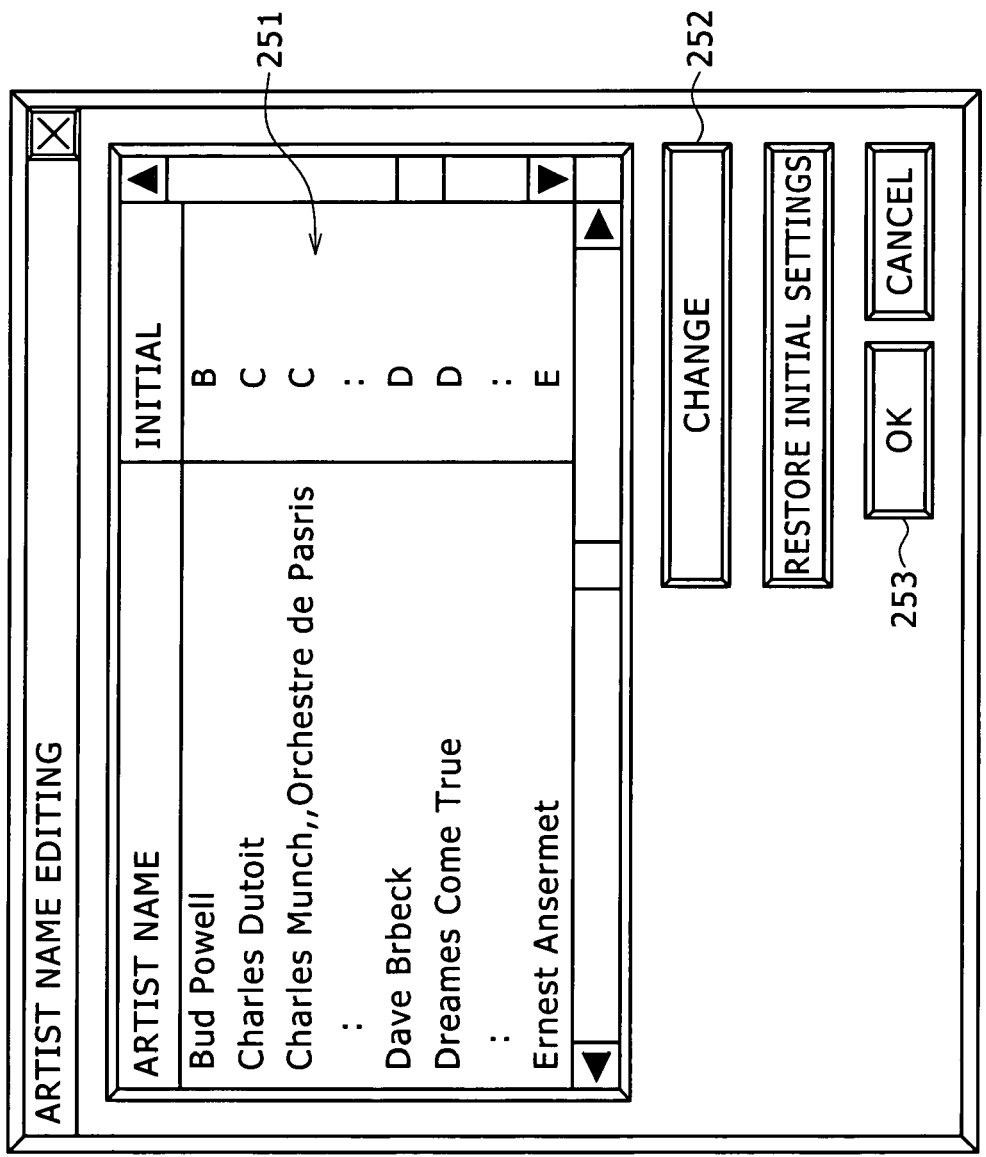
FIG. 12 is a diagram showing an example of an artist name editing screen displayed at the time of the process for changing en bloc registered initial letters corresponding to a plurality of artist names from the registered data.

FIG. 12 shows an example of the displayed artist name editing screen. The displayed artist name editing screen is presented as data associating artist names and initial letters (initials) of a plurality of entries registered in the album/musical piece table shown in FIG. 3A with each other.

In step S502, the user selects an entry to be changed from the entries presented on the artist name editing screen, changes the initial letter (initial), and then registers the changed initial letter. Specifically, the user clicks a change button 252 in FIG. 12. Thereafter the user selects an entry to be changed from a data display part 251, changes the initial letter (initial), and then clicks an OK button 253. Thereby the initial letter of an artist in the data entry already registered in the album/musical piece table shown in FIG. 3A can be changed and then registered.

Whether there is data yet to be changed is determined in step S503. When there is data yet to be changed, the initial letter changing process of step S502 is repeated. When changing of all data to be changed is completed, the process is ended.

The data changed in this process is reflected and registered in the management data stored in the musical piece management information storage unit 122 including the album/musical piece table shown in FIG. 3A.

An example of use of initial letter information will next be described with reference to FIG. 13 and FIG. 14. As described above, the musical piece management information storage unit 122 stores the management data including artist names and the initial letter information of the artist names, and the user can perform a data search on the basis of the initial letter information.

Figure 13:
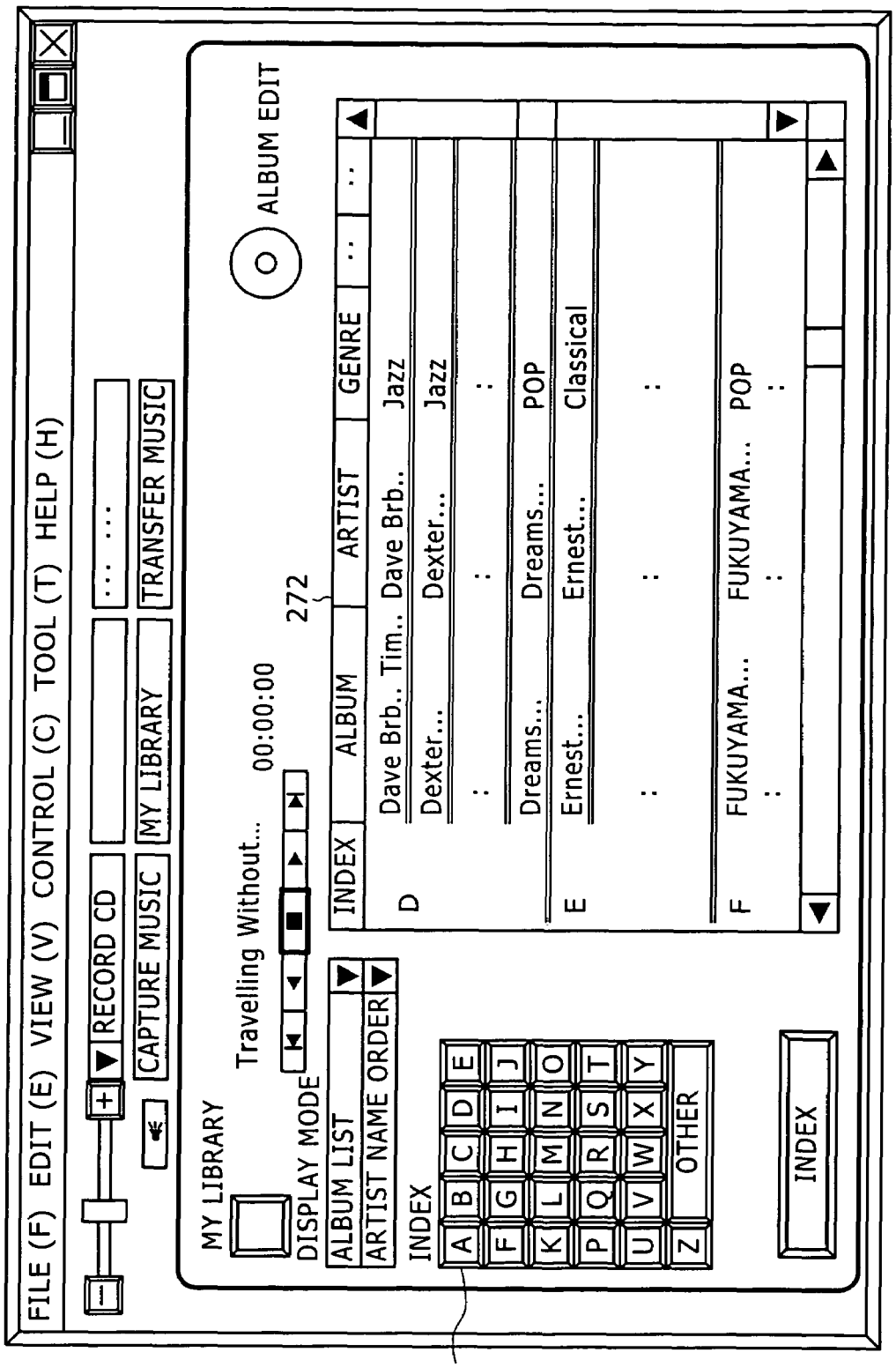
FIG. 13 is a diagram of assistance in explaining an example of use of initial letter information.
Figure 14:
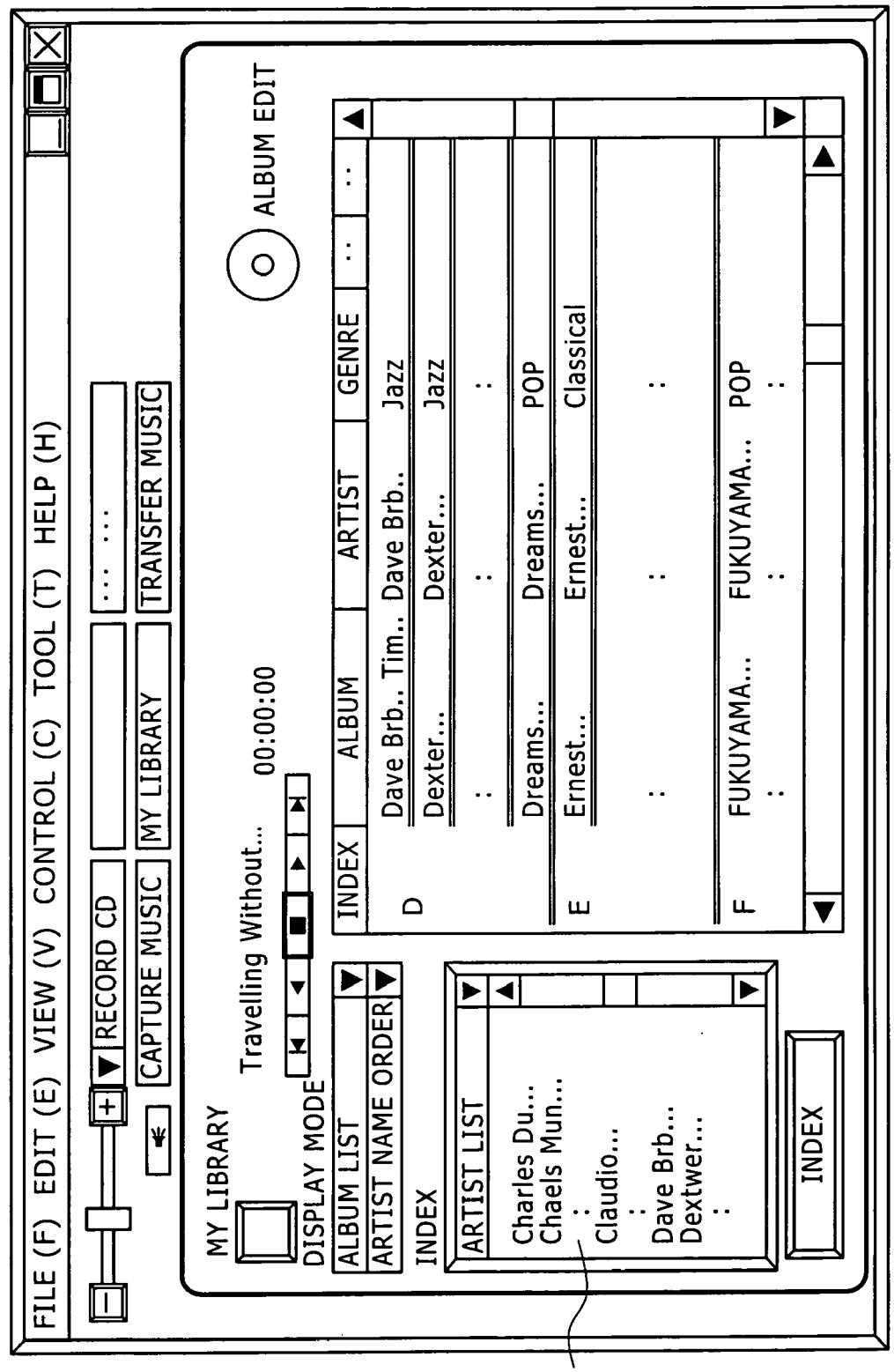
FIG. 14 is a diagram of assistance in explaining an example of use of the initial letter information.

FIG. 13 shows an example of a screen in an album search process based on the initial letter information. The display screen shown in FIG. 13 is an example of display data generated by the GUI unit 111 after the musical piece managing unit 114 extracts data from the musical piece management information storage unit 122 on the basis of user input information from the GUI unit 111 and then sends the extracted data to the GUI unit 111.

As shown in FIG. 13, alphabet list information of A to Z and "other" as an index 271 is presented on the screen presented by the GUI unit 111. The user selects one from the alphabet list of A to Z and "other" presented as the index 271, and clicks it. Thereby the click information is input to the musical piece managing unit 114, and the musical piece managing unit 114 extracts data from the musical piece management information storage unit 122.

The display example shown in FIG. 13 is an example of a screen displayed when an alphabetic character [D] is selected from the index 271. An index section 272 is set at a left end of an album information display section in FIG. 13. The initial letter information is displayed in the index section 272. When [D] is selected, entries in which the initial letter [D] is set are presented from a top of the album information display section, and subsequent album information is displayed in alphabetical order of D, E, F . . . .

The user selects and clicks an arbitrary alphabetic character [A to Z] or [other] from the index 271 and can make album information having the selected alphabetic character set as initial letter information thereof displayed.

Incidentally, a data search through the management information can also be performed from an artist name. As shown in FIG. 14, for example, a list of artist names is presented as an index 281. The user selects and clicks this artist name. Thereby click information is input to the musical piece managing unit 114. The musical piece managing unit 114 extracts data from the musical piece management information storage unit 122, and then sends the extracted data to the GUI unit 111. The GUI unit 111 generates display data.

In this case, album information corresponding to the selected artist name is presented at a top of an album information list, and other subsequent album information is presented in alphabetical order.

An example of a hardware configuration of the information processing apparatus performing the above-described processes will next be described with reference to FIG. 15.

A CPU (Central Processing Unit) 501 is a control unit for performing processes according to various computer programs such as programs of an OS (Operating System), a content recording and reproducing process, a content input process such as ripping or the like, a content information obtaining process based on TOC information or hash information.

A ROM (Read Only Memory) 502 stores a program used by the CPU 501, operation parameters, and the like. A RAM (Random Access Memory) 503 stores a program used in execution of the CPU 501, a parameter changed as required in the execution, and the like. A host bus 504 including a CPU bus or the like interconnects the CPU 501, the ROM 502, and the RAM 503.

The host bus 504 is connected to an external bus 506 such as a PCI (Peripheral Component Interconnect/Interface) bus or the like via a bridge 505.

The user operates a keyboard 508 when inputting various instructions to the CPU 501. The user operates a pointing device 509 when specifying or selecting a point on a screen of a display 510. The display 510 constitutes a liquid crystal display, a CRT (Cathode Ray Tube), or the like. The display 510 displays various information in the form of text and images. An HDD (hard disk drive) 511 drives a hard disk to record or reproduce information or a program to be executed by the CPU 501.

A drive 512 reads data or a program recorded on a removable recording medium 521 such as a magnetic disk, an optical disk, a magneto-optical disk, a semiconductor memory, or the like inserted in the drive 512. The drive 512 then supplies the data or the program to the RAM 503 connected thereto via an interface 507, the external bus 506, the bridge 505, and the host bus 504.

A connecting port 514 is a port for connecting an external connecting device 522 such for example as a player. The connecting port 514 has a USB, an IEEE1394, or another connecting part. The connecting port 514 is connected to the CPU 501 and the like via the interface 507, the external bus 506, the bridge 505, the host bus 504, and the like.

A communicating unit 515 is connected to a network. The communicating unit 515 performs a process for transmitting data supplied from the CPU 501, the HDD 511, or the like, or receiving data from a server. The communicating unit 515 for example performs a communication process in obtaining contents and obtaining content information.

The present invention has been explained above in detail with reference to a specific embodiment thereof. It is obvious, however, that modifications of the embodiment and substitutions may be made by those skilled in the art without departing from the spirit of the present invention. That is, the present invention has been disclosed in a form that is illustrative and is not to be considered restrictive. In order to determine the spirit of the present invention, the section of claims is to be considered.

The series of processes described in the specification can be carried out by hardware or by software or by a combined configuration of both. When a process is to be carried out by software, a program in which a process sequence is recorded can be installed into a memory within a computer incorporated in special hardware, and then executed, or installed onto a general-purpose computer capable of various processing, and then executed.

For example, the program can be recorded in advance on a hard disk or in a ROM (Read Only Memory) as a recording medium. Alternatively, the program can be stored (recorded) temporarily or permanently on a removable recording medium such as a flexible disk, a CD-ROM (Compact Disc Read Only Memory), an MO (Magneto Optical) disk, a DVD (Digital Versatile Disc), a magnetic disk, a semiconductor memory, or the like. Such removable recording media can be provided as so-called packaged software.

In addition to being installed onto a computer from a removable recording medium as described above, the program can be transferred by radio from a download site to a computer or transferred to a computer by wire via a network such as a LAN (Local Area Network), the Internet, or the like. The computer can receive the program thus transferred thereto, and install the program onto a recording medium such as a built-in hard disk or the like.

It is to be noted that the various processes described in the specification may be carried out not only in time series according to the description but also in parallel or individually according to processing capability of an apparatus performing the processes or as required. In the present specification, a system refers to a logical set configuration of a plurality of apparatus, and each component apparatus is not necessarily present within the same casing.

INDUSTRIAL APPLICABILITY

As described above, according to the constitution of the present invention, content attribute information is obtained via a recording medium such as a CD or the like, or via a network, or as user input data. An artist name is extracted from the obtained content attribute information. Initial letter information is determined on a basis of the artist name. Content information including the initial letter information is stored and registered in a data storage unit as content management information corresponding to a content file. Therefore a data search process using the initial letter information in the content management information as a search key and a sort process are made possible. The present invention is applied to for example a jukebox application that manages many contents and implements a user-friendly data management configuration.

Further, according to the constitution of the present invention, the content management information including the initial letter information of the artist name is automatically determined and registered regardless of a kind of the artist name such as the alphabet, kana, or katakana. Therefore a process is made possible which generates and registers the management data efficiently and quickly and hence reduces a burden on the user. Thus, the present invention is applied to for example a jukebox application that manages many contents, and implements a user-friendly data management configuration.

Further, according to the constitution of the present invention, the content information including the initial letter information of the artist name is stored and registered in the data storage unit as the content management information corresponding to the content file, and editing including a process of changing the registered information is made possible. Therefore, even when there is registered data that does not suit an image of the user as a result of the automatic registration, the data can be changed and set, so that management data respecting an intention of the user can be generated and registered. Thus, the present invention is applied to for example a jukebox application that manages many contents, and implements a user-friendly data management configuration.

The invention claimed is:

1. An information processing apparatus, comprising:
a data storage unit configured to store a content file including content entity data and content management information which includes two distinct types of information, an artist name and initial letter information which only stores an initial letter of said artist name; and
a data processing unit configured to extract an artist name from content attribute information as said content management information, wherein
if a same artist name has been previously stored in said data storage unit, the initial letter corresponding to the same artist name is automatically and separately stored as the initial letter of the content management information corresponding to said content file in said data storage unit, and
if a same artist name has not been previously stored in said data storage unit, determining initial letter information on a basis of the extracted artist name and automatically storing the content management information including the determined initial letter information as the content management information corresponding to said content file in said data storage unit.

2. The information processing apparatus as claimed in claim 1, wherein said data processing unit obtains content information stored on an information recording medium as a content input source, extracts the artist name from the obtained content information, and determines the initial letter information on the basis of the extracted artist name.

3. The information processing apparatus as claimed in claim 1, wherein said data processing unit extracts the artist name from content information received via a network, and determines the initial letter information on the basis of the extracted artist name.

4. The information processing apparatus as claimed in claim 1, wherein said data processing unit receives content information from a server providing service that is either TOC service or hash information service, extracts the artist name from the received content information, and determines the initial letter information on the basis of the extracted artist name.

5. The information processing apparatus as claimed in claim 1, wherein said data processing unit obtains content information based on a user input, extracts the artist name from the obtained content information, and determines the initial letter information on the basis of the extracted artist name.

6. The information processing apparatus as claimed in claim 1, wherein when a first character of the artist name is formed by an alphabetic character, said data processing unit determines the first character as an initial letter; and when the first character of the artist name is formed by a hiragana or katakana character, said data processing unit converts the first character into an alphabetic character on a basis of a character conversion table, and determines the converted character as an initial letter.

7. The information processing apparatus as claimed in claim 1, wherein said data processing unit performs an initial letter editing process of changing the initial letter information included in the content management information registered in the data storage unit on a basis of a user input, and registering the changed initial letter information.

8. The information processing apparatus as claimed in claim 1, wherein said data processing unit outputs an editing screen for editing content management information corresponding to one artist name from the content management information registered in the data storage unit to a display, changes initial letter information corresponding to the one artist name on a basis of a user input to the editing screen, and registers the changed initial letter information.

9. The information processing apparatus as claimed in claim 1, wherein said data processing unit outputs an editing screen for editing content management information to a display and stores provided initial letter information as the initial letter information corresponding to the selected artist name corresponding to a plurality of said content files on a basis of user inputs to the editing screen.

10. The information processing apparatus as claimed in claim 1, wherein said data processing unit performs a data search process using initial letter information in the content management information registered in the data storage unit as a search key, and extracts and presents content management information in which initial letter information corresponding to user-input information is registered.

11. An information processing method for an information processing device for performing a process of registering content management information which includes two distinct types of information, an artist name and initial letter information which only stores an initial letter of said artist name, said information processing method comprising:

obtaining content attribute information by the information processing device; and extracting, by the information processing device, said artist name from the content attribute information, wherein if a same artist name has been previously stored in a data storage unit, automatically and separately storing said initial letter corresponding to the same artist name as the initial letter of the content management information corresponding to a content file in said data storage unit, and if a same artist name has not been previously stored in said data storage unit, determining initial letter information on a basis of the extracted artist name, automatically storing and registering content information including the determined initial letter information as content management information corresponding to a content file in said data storage unit.

12. The information processing method as claimed in claim 11, wherein said obtaining is a process to which either a process of obtaining the content information stored on an information recording medium as a source from which contents are obtained, or a process of obtaining the content information via a network, or a process of obtaining the content information on a basis of a user input is selectively applied.

13. The information processing method as claimed in claim 11, wherein said obtaining includes receiving the content information from a server providing service that is either TOC service or hash information service.

14. The information processing method as claimed in claim 11, wherein in said determining, when a first character of the artist name is formed by an alphabetic character, the first character is determined as an initial letter; and when the first character of the artist name is formed by a hiragana or katakana character, the first character is converted into an alphabetic character on a basis of a character conversion table, and the converted character is determined as an initial letter.

15. The information processing method as claimed in claim 11, further comprising:

performing an initial letter editing process of changing the initial letter information included in the content management information registered in the data storage unit on a basis of a user input; and registering the changed initial letter information.

16. The information processing method as claimed in claim 11, further comprising:

outputting an editing screen for editing content management information corresponding to one artist name from the content management information registered in the data storage unit to a display;

changing initial letter information corresponding to the one artist name on a basis of a user input to the editing screen; and registering the changed initial letter information.

17. The information processing method as claimed in claim 11, further comprising:

outputting an editing screen for editing content management information corresponding to a plurality of artist names from the content management information registered in the data storage unit to a display;

changing en bloc initial letter information corresponding to the plurality of artist names on a basis of user inputs to the editing screen; and registering en bloc the changed initial letter information.

18. The information processing method as claimed in claim 11, further comprising:

performing a data search process using initial letter information in the content management information registered in the data storage unit as a search key; and extracting and presenting content management information in which initial letter information corresponding to user-input information is registered.

\* \* \* \* \*